(12) United States Patent
Vinciarelli

(10) Patent No.: US 8,791,591 B1
(45) Date of Patent: Jul. 29, 2014

(54) ZERO-CURRENT SWITCHING MULTI-OUTPUT POWER CONVERTER WITH IMPROVED CROSS-REGULATION

(75) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 984 days.

(21) Appl. No.: 12/710,786

(22) Filed: Feb. 23, 2010

(51) Int. Cl.
*H02J 1/00* (2006.01)
*G05F 1/577* (2006.01)

(52) U.S. Cl.
USPC ............................................ 307/28; 323/267

(58) Field of Classification Search
USPC ............................................ 307/28; 323/267
See application file for complete search history.

(56) References Cited

U.S. PATENT DOCUMENTS

| | | | | |
|---|---|---|---|---|
| 5,552,695 | A | 9/1996 | Schwartz | 323/271 |
| 6,421,262 | B1 | 7/2002 | Saxelby et al. | 363/127 |
| 6,788,033 | B2 | 9/2004 | Vinciarelli | 323/225 |
| 6,987,679 | B2 | 1/2006 | Gan et al. | 363/89 |
| 7,154,250 | B2 | 12/2006 | Vinciarelli | 323/240 |
| 7,358,707 | B2 * | 4/2008 | Johnson et al. | 323/267 |
| 2007/0109822 | A1 | 5/2007 | Kuan | 363/21.14 |
| 2008/0130326 | A1 | 6/2008 | Kuan | 363/21.14 |

OTHER PUBLICATIONS

Linear Technology, LTC1149 LTC1149-3.3/LTC1149-5, "High Efficiency Synchronous Step-Down Switching Regulators", 1149fa/LT/TP 0898 Rev. A 2K, 1993.
Marrero, "Improving Cross Regulation of Multiple Output Flyback Converters", PCIM Conference Proceedings, 9 pages, 1995.
Ji, Chuanwen, et al., "Cross Regulation in Flyback Converters: Analytic Model and Solution," IEEE Transactions on Power Electronics, vol. 16, No. 2, Mar. 2001, pp. 231-239.

* cited by examiner

*Primary Examiner* — Hal Kaplan
(74) *Attorney, Agent, or Firm* — Fish & Richardson P.C.

(57) ABSTRACT

A zero-current switching multiple-output-regulator ("ZCS MOR") converts power from an input source via a transformer to a main output and one or more auxiliary outputs. Each output is coupled to a respective winding of a transformer preferably by switches controlled as synchronous rectifiers. The synchronous rectifier for each auxiliary output preferably turns on at the start of current flow in its respective winding and off as its respective current returns to zero, independently of the other outputs. The synchronous rectifier for the main output may be held ON until the synchronous rectifiers for each of the auxiliary outputs stop conducting. In the event energy stored in the transformer is insufficient to supply one or more heavily loaded auxiliary outputs, the current in the winding for the main output is allowed to reverse thereby transferring energy from the main output capacitance to the heavily loaded auxiliary outputs. A feed back loop is preferably closed around the main output for regulation. The ZCS MOR may use Fly-back, Buck, and Buck-Boost topologies.

43 Claims, 13 Drawing Sheets

| | Input Phase | ZVS S3 | In-Out Phase | ZVS S2 | Freewheel Phase | ZVS S4 | Clamped Phase | ZVS S1 |
|---|---|---|---|---|---|---|---|---|
| S1 | ON | ON | | | | | | ON |
| S2 | | | | | ON | ON | ON | |
| S3 | | | ON | ON | ON | | | |
| S4 | ON | | ON | | | | ON | |

FIG. 3

| | Input Phase | ZVS S3 | In-Out Phase | ZVS S2 | Auxiliary Phase | ZVS S4 | Clamped Phase | ZVS S1 |
|---|---|---|---|---|---|---|---|---|
| S1 | ON | ON | | | | | | ON |
| S2 | | | | | ON | ON | ON | |
| S3 | | | ON | ON | ON | | | |
| S4 | ON | | ON | | | | ON | |

FIG. 5

ZERO-CURRENT SWITCHING MULTI-OUTPUT POWER CONVERTER WITH IMPROVED CROSS-REGULATION

TECHNICAL FIELD

This invention relates to the field of electrical power conversion and more particularly to power converters having two or more outputs.

BACKGROUND

Electronic circuits and systems often require more than one regulated operating voltage. One way to provided multiple regulated voltages is to provide a plurality of regulating power converters, each regulating power converter providing one of the required operating voltages. Another way is to provide a multi-output power converter that is arranged to provide more than one regulated voltage output.

One example of a multi-output power converter is a forward switching power converter comprising a transformer with a plurality of secondary windings: because of the characteristic of forward converters, each secondary winding may require a dedicated regulator (e.g., linear, switching, magnetic) to maintain its respective voltage output in regulation.

Another example of a multi-output power converter is shown in FIG. 1. In FIG. 1, a flyback converter 300 comprises a transformer 302 having a single primary winding 303 and multiple secondary windings 304a, 304b. When switch 305 is turned on by switch controller 310, the input voltage, Vin, is impressed across primary winding 303; rectifiers 306a, 306b are reverse biased and non-conductive; and magnetic energy is stored in transformer 302. When switch 305 is turned off by switch controller 310, the voltages across the windings reverse, the rectifiers conduct and the stored energy is transferred to storage capacitors 307a, 307b and loads 308a, 308b. The switch controller 310 varies the duty cycle of switch 305 as a means of maintaining a first output voltage, across load 308a, at an essentially fixed value Vo. Storage capacitor C1 307a smoothes the output voltage Vo.

During the time that the switch 305 is off, and assuming ideal components (e.g., no voltage drops across diodes 306a, 306b; no winding resistances or leakage inductance in the transformer 302) the voltage across secondary winding 304a will be clamped to Vo and the voltage across secondary winding 304b will be V2=(N3/N2)*Vo, where N3 and N2 are the number of turns on windings 304a and 304b, respectively. Assuming ideal components and a sufficiently large storage capacitor C2 307b, the second output voltage, across load 308b, will also be essentially equal to V2.

The example of FIG. 1 may be extended to comprise several secondary windings, each winding having a relative number of turns that is selected to provide a particular value of output voltage. By this means, regulation of a single output may be used to generate a plurality of other regulated outputs of different values.

In practice, cross-regulation (as used herein, the term "cross regulation" in a multiple-output power converter shall refer to the dependency of one or more voltage outputs on the values of one or more other voltage outputs) in a multiple-output flyback regulator is affected by the non-ideal nature of components. Transformer resistances and leakage inductances, and voltage drops across rectifiers, typically cause degradation in the cross-regulation performance of the converter.

Cross-regulation may also depend upon the relative loading on different outputs. In the converter of FIG. 1, for example, the total energy available for delivery to the first output (at voltage Vo) and the second output (at voltage V2) during each converter operating cycle is the amount of energy stored in transformer 303 during the on-time of switch 305. The duty cycle of the converter (e.g., the fraction of each converter operating cycle that switch 305 is turned on), however, decreases as the power delivered to the first output (i.e., to load 308a) decreases. If the first output is relatively lightly loaded, or unloaded, and the second output is relatively heavily loaded, there may not be sufficient energy stored in the transformer during each converter operating cycle to maintain the second output at the voltage V2.

A variety of methods have been proposed to improve cross-regulation in multiple-output power supplies. Examples of such methods may be found in Marrero, Improving Cross Regulation of Multiple Output Flyback Converters, PCIM Conference Proceedings 1996; Schwartz, Synchronously Rectified Buck-Flyback DC to DC Power Converter, U.S. Pat. No. 5,552,695; and Gan et al, Multiple Output Converter with Improved Cross Regulation U.S. Pat. No. 6,987,679.

SUMMARY

In general, one aspect features an apparatus for converting power from an input source for delivery to a main output at a main voltage and a first auxiliary output at a first auxiliary voltage. The apparatus may include a transformer with a main winding and a first auxiliary winding. A primary switch may be connected to drive the transformer with power from the input source. A controller may be adapted to operate the primary switch in a series of converter operating cycles. A main switch may be connected to the main winding and configured in an ON state to carry a current flowing in the main winding at times when the primary switch is OFF to deliver power to the main output. A first auxiliary rectification circuit may be connected to the first auxiliary winding and configured in an ON state to carry a first auxiliary current flowing in the first auxiliary winding to deliver power to the first auxiliary output. The main switch may be configured to turn ON for a first condition and selectively turn OFF for a second condition or selectively remain ON past occurrence of the second condition. The first auxiliary rectification circuit may be configured to turn ON for a third condition and to turn OFF for a fourth condition.

In general, another aspect features a method for converting power from an input source for delivery to a main output at a main voltage and a first auxiliary output at a first auxiliary voltage. The method may include providing a transformer with a main winding and a first auxiliary winding and using a primary switch to drive the transformer with power from the input source. The primary switch may be operated in a series of converter operating cycles. A main switch connected to the main winding may be used, in an ON state, to carry a current flowing in the main winding at times when the primary switch is OFF to deliver power to the main output. A first auxiliary rectification circuit connected to the first auxiliary winding may be used, in an ON state, to carry a first auxiliary current flowing in the first auxiliary winding to deliver power to the first auxiliary output. The main switch may be turned ON for a first condition and selectively turned OFF for a second condition or held ON past occurrence of the second condition. The first auxiliary rectification circuit may be turned ON for a third condition and OFF for a fourth condition.

Implementations of the apparatus or method may include one or more of the following features. The first condition may essentially coincide with the start of the current flowing in the main winding. The second condition may essentially coincide with the current in the main winding returning to zero. The third condition may essentially coincide with the start of auxiliary current flow in the first auxiliary winding. The fourth condition may essentially coincide with the auxiliary current flow in the first auxiliary winding returning to zero. The main switch may be configured to remain ON until occurrence of the fourth condition. A main switch controller may be used to (a) turn ON the main switch at or near the start of the flow of current in the main winding and (b) turn OFF the main switch after (i) the current in the main winding returns to zero and (ii) the first auxiliary current in the first auxiliary winding returns to zero.

A first auxiliary switch may be used in the first auxiliary circuit to carry a current flowing in the first auxiliary winding with a polarity tending to supply power to the first auxiliary output in an ON state and to block auxiliary current flowing in the first auxiliary winding with a polarity tending to withdraw power from the first auxiliary output in an OFF state. The first auxiliary rectification circuit may include a first auxiliary switch controller. The voltage polarity across the first auxiliary switch may be sensed and the first auxiliary switch may be turned ON for a first voltage polarity and OFF for an opposite voltage polarity across the first auxiliary switch. The first auxiliary switch controller may be configured to sense the voltage polarity across the first auxiliary switch. A switch controller may be used to (a) turn ON the main switch essentially at the start of the flow of current in the main winding and (b) turn OFF the main switch after (i) the current in the main winding returns to zero and (ii) the opposite polarity has been sensed across the first auxiliary switch. A first signal may be provided to indicate whether the first or opposite polarity has been sensed across the first auxiliary switch. The switch controller may include a main switch controller including an input for receiving the first signal and an auxiliary switch controller for providing the signal. The voltage polarity across the main switch may be sensed and the main switch may be turned ON for a first voltage polarity across the main switch and OFF for an opposite voltage polarity across the main switch when the opposite polarity has been sensed across the first auxiliary switch. The main switch controller may sense the voltage polarity across the main switch.

A second auxiliary output, a second auxiliary winding, and second auxiliary rectification circuit, including a second auxiliary switch and a second auxiliary switch controller may be provided. The second auxiliary switch controller may be configured to turn the second auxiliary switch ON to carry auxiliary current flowing in the second auxiliary winding with a polarity tending to supply power to the second auxiliary output and OFF to block auxiliary current flowing in the second auxiliary winding with a polarity tending to withdraw power from the second auxiliary output. A main switch controller may have an input for receiving a signal from the first and second auxiliary switch controllers and be configured to (a) turn ON the main switch essentially at the start of the flow of current in the main winding and (b) turn OFF the main switch after (i) the current in the main winding returns to zero and (ii) the signal indicates that the first and second auxiliary switch controllers have or are about to turn the first and second auxiliary switches OFF. The first auxiliary switch controller may be configured to sense a voltage polarity across the first auxiliary switch and to turn the first auxiliary switch ON for a first voltage polarity and OFF for an opposite voltage polarity. The second auxiliary switch controller may be configured to sense a voltage polarity across the second auxiliary switch and to turn the second auxiliary switch ON for a first voltage polarity and OFF for an opposite voltage polarity. The main switch controller may include an input for sensing a voltage polarity across the main switch and turn the main switch ON for a first voltage polarity and OFF for an opposite voltage polarity when the signal indicates that the first and second auxiliary switch controllers have sensed the opposite polarity across the first and second auxiliary switches. The main switch controller may be adapted to sense the main voltage.

The primary switch may be used to drive a primary winding of the transformer with power from the input source. The main winding may be a secondary winding of the transformer. The main winding may be the primary winding of the transformer and have first and second terminals. The primary switch and main switch may be connected to the first terminal of the main winding and the second terminal of the main winding may be connected to supply current to the main output. The primary switch may be used to carry current between a first terminal of the input source and the first terminal of the main winding and the main switch may be used to carry current between a second terminal of the input source and the first terminal of the main winding. The main winding may be the primary winding of the transformer and have first and second terminals. The primary switch and main switch may be connected to the first terminal of the main winding and a second primary switch and a second main switch may be connected to the second terminal of the main winding. Each converter operating cycle my include: (i) an input ("IN") phase during which the main winding is connected across the source for a time $T_{IN}$, (ii) an input-output ("TO") phase during which the main winding is connected between the source and the main output for a time $T_{IO}$, and (iii) an auxiliary ("AUX") phase during which the main winding is connected across the output for a time $T_{AUX}$. Each converter operating cycle may further include (iv) a clamp phase during which the main winding of the transformer is clamped, the clamp phase being characterized by essentially zero voltage across the main winding and an average value of current flowing in the main winding. The primary switch may be connected or used to carry current between a first terminal of the input source and the first terminal of the main winding. The main switch may be connected or used to carry current between a second terminal of the input source and the first terminal of the main winding. The second primary switch may be connected or used to carry current between the second terminal of the main winding and the second terminal of the input source. The second main switch may be connected or used to carry current between the second terminal of the main winding and the main output.

A second auxiliary winding may be provided and a second auxiliary switch may be used in a second auxiliary circuit to carry a current flowing in the second auxiliary winding with a polarity tending to supply power to the second auxiliary output in an ON state and to block auxiliary current flowing in the second auxiliary winding with a polarity tending to withdraw power from the second auxiliary output in an OFF state. The voltage polarity across the first auxiliary switch may be sensed and the first auxiliary switch may be turned ON for a first voltage polarity and OFF for an opposite voltage polarity across the first auxiliary switch. A first signal indicating whether the first or opposite polarity has been sensed across the first auxiliary switch may be provided. The voltage polarity across the second auxiliary switch and turning the second auxiliary switch ON for a first voltage polarity and OFF for an opposite voltage polarity across the second auxiliary switch. A second signal may be provided indicating whether the first or opposite polarity has been sensed across the second auxiliary switch. A switch controller may be used to (a) turn ON the main switch essentially at the start of the flow of current in the main winding and (b) turn OFF the main switch after (i)

the current in the main winding returns to zero and (ii) the first signal indicates the opposite polarity has been sensed across the first auxiliary switch and (iii) the second signal indicates the opposite polarity has been sensed across the second auxiliary switch. The switch controller may sense a voltage polarity across the main switch to determine when the flow of current in the main winding starts and when the current in the main winding returns to zero. The switch controller may sense the main voltage.

In general, another aspect features an apparatus for converting power from an input source for delivery to a main output at a main voltage and a plurality of auxiliary outputs at respective auxiliary voltages. The apparatus may include a transformer with a main winding and a plurality of auxiliary windings. A primary switch may be connected to drive the transformer with power from the input source. A main switch may be connected to the main winding and configured in an ON state to carry a current flowing in the main winding at times when the primary switch is OFF to deliver power to the main output. A plurality of auxiliary rectification circuits may each be connected to a respective auxiliary winding and configured in an ON state to carry a respective auxiliary current flowing in the respective auxiliary winding to deliver power to the respective auxiliary output. A controller may operate the primary switch in a series of converter operating cycles. The main switch may be configured to turn ON for a first condition and selectively turn OFF for either a second condition or a fifth condition. Each auxiliary rectification circuit may be configured to turn ON for a respective third condition and to turn OFF for a respective fourth condition.

Implementations of the apparatus may include one or more of the following features. The second condition in a respective converter operating cycle may be essentially when a current flowing from the main winding to the main output with a polarity that delivers power to the main output reaches zero current. The respective fourth condition for each auxiliary switch in a respective converter operating cycle may be essentially when the auxiliary current flowing from its respective auxiliary winding with a polarity that delivers power to its respective auxiliary output reaches zero current. The fifth condition may be essentially when the last of the respective fourth conditions occurs. The main switch may turn OFF essentially for the occurrence of the second condition or the fifth condition whichever occurs later in a converter operating cycle. The third condition for each auxiliary switch in a respective converter operating cycle may be essentially when the auxiliary current begins to flow from its respective auxiliary winding with a polarity that delivers power to its respective auxiliary output. The first condition in a respective converter operating cycle may be essentially when a current begins to flow from the main winding to the main output with a polarity that delivers power to the main output.

The details of one or more embodiments of the invention are set forth in the accompanying drawings and in the detailed description below. Other features and advantages of the invention will be apparent and clearly understood by reference to the detailed description, to the drawings, and to the appended claims.

DESCRIPTION OF THE DRAWINGS

We first briefly describe the drawings:

FIG. 3 shows operating phases of a power converter.

FIG. 5 shows operating phases of a multi-output regulator according to the invention.

Like reference numbers in the various drawings indicate like elements.

DETAILED DESCRIPTION

Efficient buck-boost converters are described in Vinciarelli, Buck-Boost DC-DC Switching Power Conversion, U.S. Pat. No. 6,788,033, issued Sep. 7, 2004; and in Vinciarelli, Buck-Boost DC-DC Switching Power Conversion, U.S. Pat. No. 7,154,250, issued Dec. 26, 2006, both assigned to VLT Corp. and incorporated here by reference in their entirety (the "Buck-Boost Patents"). The term "standard buck-boost converter" used herein refers to the buck-boost regulator described in the Buck-Boost Patents (without the auxiliary circuitry described below).

Figure 2:
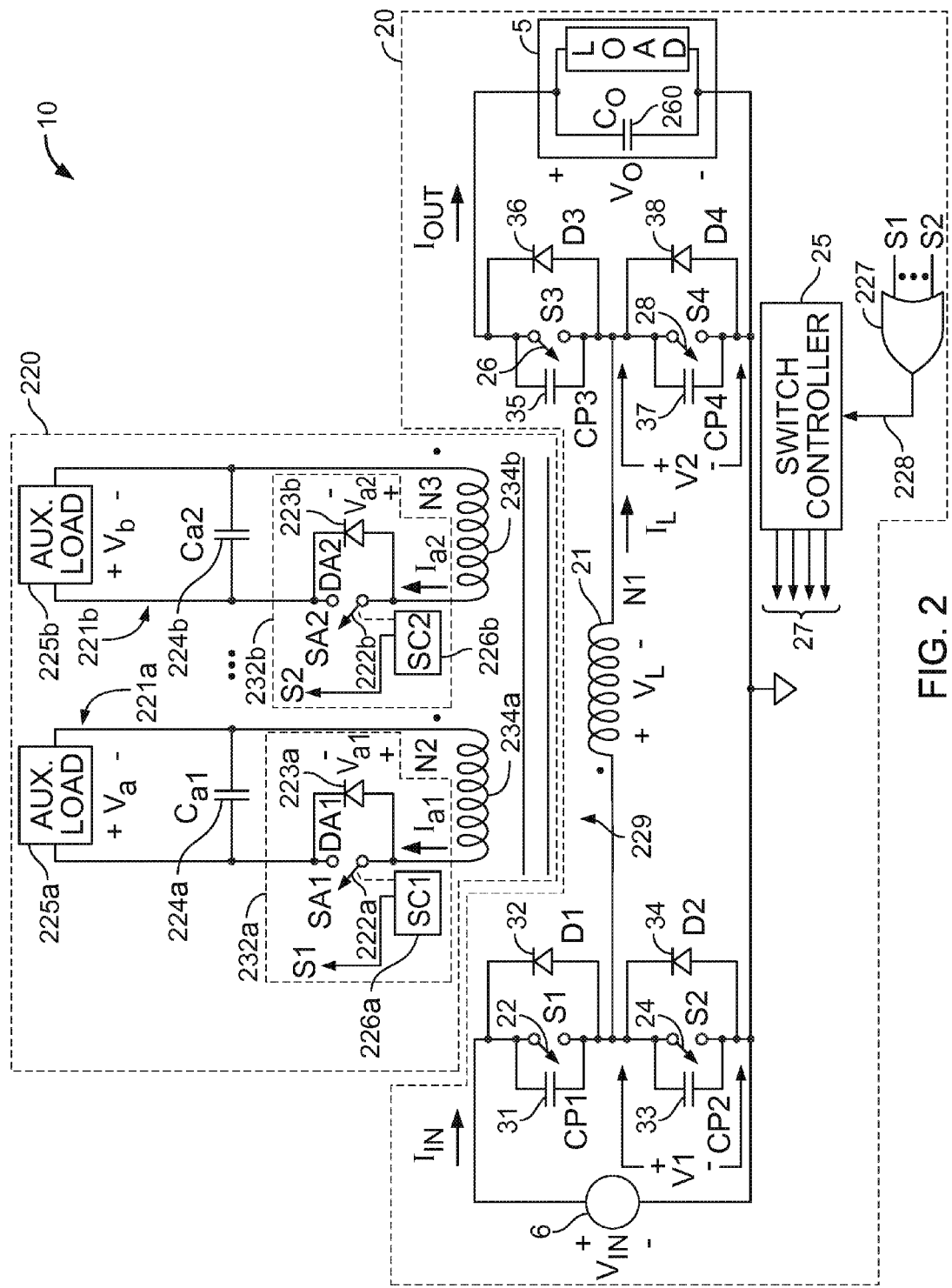
FIG. 2 shows a multi-output regulator according to the invention.

Referring to FIG. 2 an embodiment of a zero-current switching ("ZCS") multi-output regulator ("MOR") 10 is shown. The MOR 10 comprises an underlying buck-boost regulator 20, analogous to a standard buck-boost converter modified by the addition of auxiliary output circuitry 220 and related control circuitry 227. The term "underlying buck-boost converter" used herein refers to the buck-boost regulator portion (e.g. buck-boost regulator 20 in FIG. 2) of the MOR 10. For consistency, components in the underlying buck-boost regulator 20 of FIG. 2 having an equivalent in the standard buck-boost regulator 20 shown in FIG. 3 of the Buck-Boost Patents are labeled with the same reference designations.

As shown in FIG. 2, the buck-boost regulator 20 may comprise: four switches S1 22, S2 24, S3 26 and S4 28; diodes D1 32, D2 34, D3 36 and D4 38; switch controller 25 (described below); and an inductor 21 of inductance L, comprising a winding having N1 turns. An input source 6 supplies power at an input voltage, Vin, to the input of the converter 20 which delivers power to a load 5 at a controlled output voltage, Vo. The switch controller 25 delivers control signals 27 to switches S1-S4 to control the ON and OFF states of the switches. Capacitances Cp1 31, Cp2 33, Cp3 35 and Cp4 37, represent the circuit parasitic capacitances, including those of the switches S1-S4, diodes D1-D4 and inductor 21. Switches S1-S4, diodes D1-D4 and some portion of capacitances Cp1-Cp4 may be physically embodied in the same components. For example, MOSFET switches embody a controllable channel, analogous to switches S1-S4, a "body diode" analogous to diodes D1-D4, and have intrinsic parasitic capacitances, analogous to capacitances Cp1-Cp4.

Figure 4A:
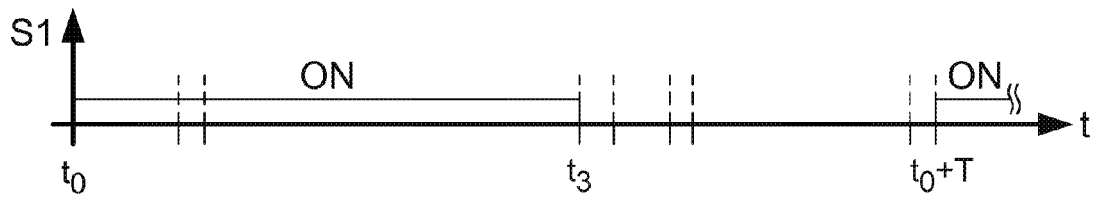
FIGS. 4A to 4E show operating waveforms of a power converter.
Figure 4B:
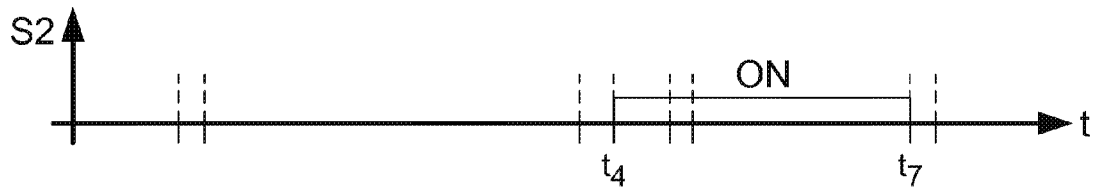
Figure 4C:
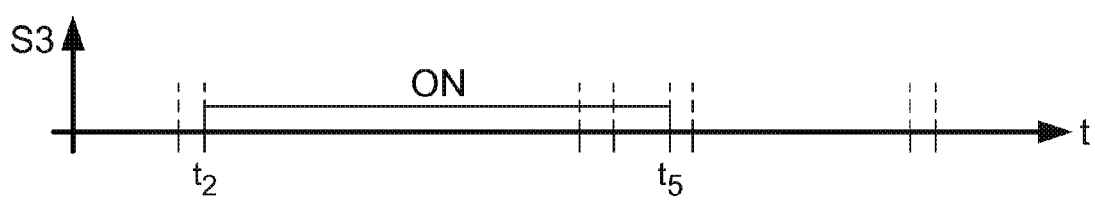
Figure 4D:
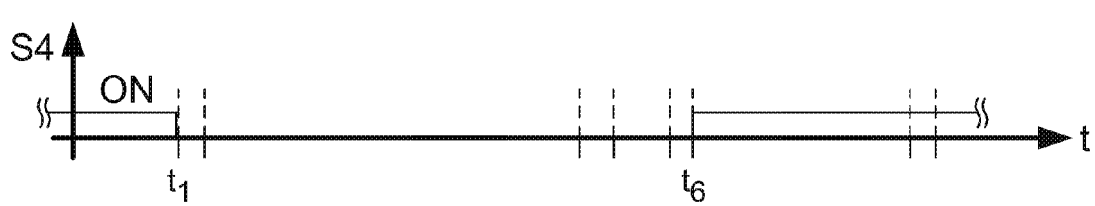
Figure 4E:
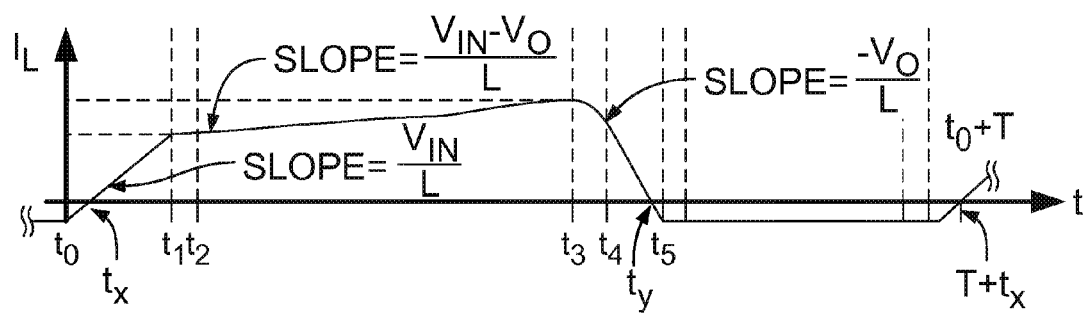

Operation of the underlying buck-boost converter 20 is similar to the standard buck-boost converter described in detail in the Buck-Boost Patents and is briefly summarized herein with reference to FIG. 3 (corresponding to FIG. 4 in the Buck-Boost Patents) and FIGS. 4A-4E (corresponding to FIGS. 5A-5E in the Buck-Boost Patents). In operation each converter operating cycle may comprise eight sequenced phases, as illustrated in FIGS. 3 and 4A to 4E: during an Input Phase, between times t0 and t1, energy from the input source 6 is stored in inductor 21; during an Input-Output Phase, between times t2 and t3, energy is delivered from the input source to the inductor 21 and the load 5 (FIG. 4E illustrates the inductor current for buck operation, with Vin>Vo; the waveforms for boost operation are similar, except that the slope during the Input-Output Phase is negative because Vin<Vo); during a Freewheel Phase, between times t4 and t5, energy from the inductor is delivered to the load; during a Clamp Phase, between times t6 and t7, a small negative current flows in the inductor 21. Zero-Voltage Switching ("ZVS") intervals, as that term is defined in the Buck-Boost Patents, are interposed between the other phases as shown in FIG. 3. Each phase has a corresponding set of pre-determined states of switches S1 22, S2 24, S3 26 and S4 28, as shown in FIG. 3. As shown in FIGS. 4A-E, the Freewheel Phase is ended at a time at which the current $I_L$ in inductor 21 is very close to zero. It will be appreciated from the illustrated sequence of phases that the underlying buck-boost power converter 20 provides output regulation, e.g. the output voltage, Vo, and provides ZVS transitions for the four primary-side switches S1 22, S2 24, S3 26 and S4 28, operating with high conversion efficiency over a wide range of input voltages, Vin. Mode changes are not required to transition between buck and boost modes, i.e. the same sequence of phases may be used irrespective of the relative values of Vin and Vo.

Referring to FIG. 2, the MOR 10 includes the underlying buck-boost converter 20 analogous to a standard buck-boost converter modified by the addition of auxiliary circuitry 220 to provide additional outputs. As shown, the auxiliary circuitry 220 comprises two auxiliary output circuits 221a, 221b, each auxiliary output circuit comprising an auxiliary winding 234a, 234b; an auxiliary switch SA1 222a, SA2 222b; a secondary switch controller SC1 226a, SC2 226b; an auxiliary diode DA1 223a, DA2 223b; and an auxiliary storage capacitor Ca1 224a, Ca2 224b. Auxiliary storage capacitor Ca1 smoothes the voltage output, Va, of auxiliary output circuit 221a; auxiliary storage capacitor Ca2 smoothes the voltage output, Vb, of auxiliary output circuit 221b. An auxiliary load 225a is connected to the output of auxiliary output circuit 221a; an auxiliary load 225b is connected to the output of auxiliary output circuit 221b. The addition of the auxiliary windings 234a, 234b magnetically coupled to inductor 21 forms a transformer 229. Although two auxiliary output circuits 221a, 221b are shown in FIG. 2, it is understood that the discussion that follows is generally applicable to any number of auxiliary output circuits. The output of the MOR 10 connected to load 5, i.e. the output of the underlying buck-boost converter 20, will be referred to as the "main output" and the outputs delivered to auxiliary loads 225a, 225b will be referred to as the "auxiliary outputs."

The auxiliary output circuits 221a, 221b are shown each having an active rectifier circuit 232a, 232b, respectively including a switch controller (SC1 226a, SC2 226b), an auxiliary switch (SA1 222a, SA2 222b), and an auxiliary diode (DA1 223a, DA2 223b). The active rectifier circuits 232a, 232b, may be of the kind described in Active Rectifier, Saxelby et al, U.S. Pat. No. 6,421,262, issued Jul. 16, 2002, (assigned to VLT, Inc. and incorporated here by reference). Each active rectifier circuit exhibits very low voltage drop in the forward direction (positive Va1, Va2, FIG. 2) owing to its respective auxiliary switch being turned on; and blocks current flow in the reverse direction. Each switch controller SC1 226a, SC2 226b may provide a respective conduction output signal S1, S2 indicative of whether its respective active rectifier circuit is forward biased, i.e. conducting current in its forward direction (the direction shown for currents Ia1, Ia2 by arrows in FIG. 2).

As shown in FIG. 2, an OR gate 227 receives the S1 and S2 signals (and, if there are additional auxiliary circuits, the OR gate would have additional inputs for receiving the conduction output signals from the additional switch controllers) and delivers a composite conduction signal ("CCS") 228 to switch controller 25, indicating whether one or more of the active rectifier circuits in the auxiliary output circuits are conducting forward current.

As shown in FIG. 5, the switch controller 25 of FIG. 2 controls the four switches S1 22, S2 24, S3 26 and S4 28 to operate in the same sequence as that shown in FIG. 3 for the standard buck-boost converter 20. Comparing FIGS. 3 and 5, all but one of the phases in each figure has a counterpart phase with the same name in the other figure (Input; Input-Output; Clamped; ZVS). Operation of the MOR 10 is essentially the same during these like-named phases as the operation of the standard buck-boost converter. Operation during the Auxiliary Phase in a MOR, however, is different from operation during the Freewheel Phase of the standard buck-boost converter, as discussed below.

Referring to FIGS. 6A-6F, waveforms are shown for the MOR 10 operating during the Auxiliary Phase with the main output relatively heavily loaded. The Auxiliary Phase is shown beginning at time t4 with an initial current $I_L(t4)=I_{X1}$ flowing in winding 21. Before this time, the relative voltages in the windings 21, 234a, 234b are such that the active rectifiers 232a, 232b are reverse biased and the currents Ia1 and Ia2 are essentially zero. At time t4, however, the Auxiliary Phase is initiated by turning switch S2 ON (FIG. 5), impressing the main output voltage, Vo, across winding 21 so that $V_L=-Vo$. Although the Auxiliary phase may be initiated by turning switch S2 ON, the active rectifiers 232a, 232b may become forward biased and currents Ia1 and Ia2 begin to ramp up earlier depending upon the primary-reflected output voltages relative to the decreasing voltage, V1, across S2 during the ZVS-S2 Phase.

The terms "primary winding" and "main winding" apply to the same winding 21 in the topology shown in FIG. 2 because winding 21 is both driven by the input source functioning as the primary winding of the transformer and also directly connected to feed the main output functioning as the main output winding ("main winding"). In other topologies such as the flyback converter shown in FIG. 11 and discussed below, the primary winding 21 of the transformer (driven by the input source) is distinct from the main winding 501 (directly connected to feed the main output) which is one of several secondary windings.

Figure 7:
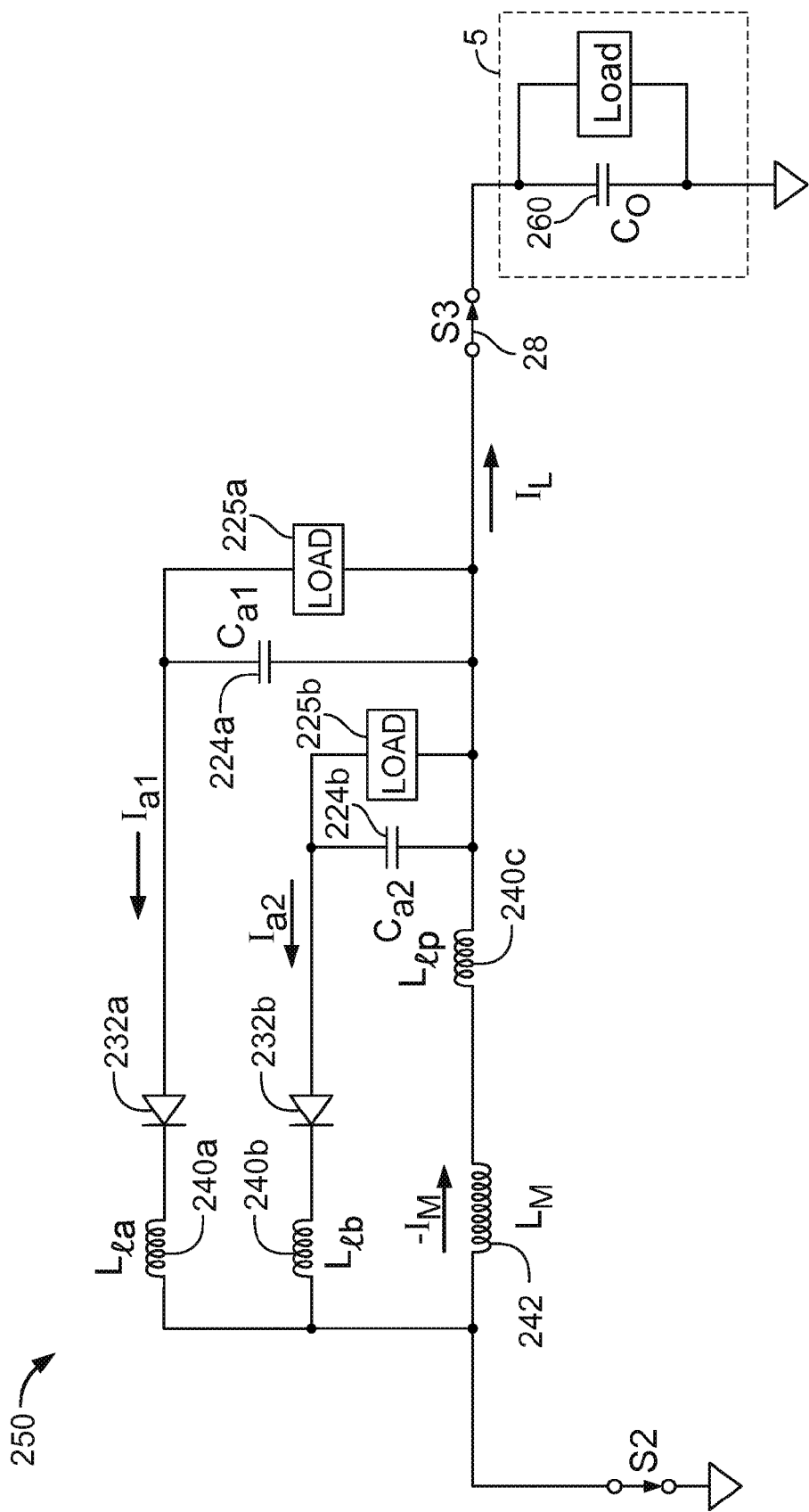
FIG. 7 shows an equivalent circuit of the converter of FIG. 2.

A simplified equivalent circuit of the MOR 10 during the Auxiliary Phase 250 is shown in FIG. 7. In the Figure, the auxiliary circuits 221a, 221b are reflected back into the main output winding of transformer 229 ("main-reflected") and the leakage inductances 240a, 240b, 240c associated with the transformer are shown. The active rectifier circuits 232a, 232b are illustrated as ideal diodes. At time t4, the initial current in both the main leakage inductance 240c and the magnetizing inductance Lm 242 are equal to $I_{X1}$ and the initial currents in auxiliary leakage inductances 240a, 240b are zero. For simplicity, FIG. 7 assumes that N1=N2=N3; it is understood that different numbers of turns, and hence different turns ratios, will alter the values of main-reflected components by appropriate multiplication or division by the respective turns ratio.

Beginning at time t4, currents Ia1 and Ia2 begin to increase in their respective leakage inductances 240a, 240b (FIGS. 6B and 6C) and the magnetizing current, Im, (shown as the dashed waveform in FIG. 6A) begins to decline, as does the current $I_L$ (shown as the solid waveform in FIG. 6A) that flows toward the main output (load 5, FIGS. 2 and 7). In response to the forward bias across active rectifiers 232a, 232b, the auxiliary switch controllers 226a, 226b turn on their respective switches 222a and 222b at essentially zero voltage and essentially zero current, and output the signals S1 and S2. The S1 and S2 signals cause CCS 228 to go high (FIGS. 6D, 6E, 6F) at time t4.

Between times t4 and t1 at sufficient energy has been delivered to the output of auxiliary circuit 221a to charge auxiliary storage capacitor Ca1 224a to the auxiliary output voltage, Va, causing current Ia1 to decline to zero (FIG. 6B) and reversing the bias across active rectifier 232a. In response, auxiliary switch controller 226a turns switch 222a OFF at essentially zero voltage and essentially zero current and removes signal S1 (S1 transitions low FIG. 6D). The CCS 228 remains high because signal S2 remains high (FIG. 6E) indicating that active rectifier 232b is still forward biased and conducting (FIG. 6C). At time ta2, sufficient energy has been delivered to the output of auxiliary circuit 221b to charge auxiliary storage capacitor Ca2 224b to auxiliary output voltage, Vb, causing current Ia2 to decline to zero and reverse the bias across active rectifier 232b. In response, auxiliary switch controller 226b turns switch 222b OFF at essentially zero voltage and essentially zero current and removes signal S2 (S2 transitions low FIG. 6D), causing CCS 228 to go low (FIG. 6F). Between times ta2 and t5, the currents Ia1 and Ia2 are essentially zero and the current $I_L$=Im. At time t5, the current $I_L$ passes through zero and switch S3 28 is turned OFF at essentially zero current and essentially zero voltage, terminating the Auxiliary Phase.

In the example of FIGS. 6A to 6F the load on the main output is sufficiently large so that there is enough magnetic energy stored in transformer 229 at time t4 to supply the total energy requirements of both the main output and both auxiliary outputs during the Auxiliary Phase; the current $I_L$ is positive when CCS 228 goes low (at time ta2, FIG. 6F) and the switch controller 25 turns S3 off when the current $I_L$ ultimately declines to zero. Under these circumstances the auxiliary voltage outputs are "regulated" at values that are essentially equal to the main output voltage, Vo, multiplied by the respective turns ratio, e.g., Va=(N2/N1)*Vo and Vb=(N3/N1)*Vo.

Figure 6A:
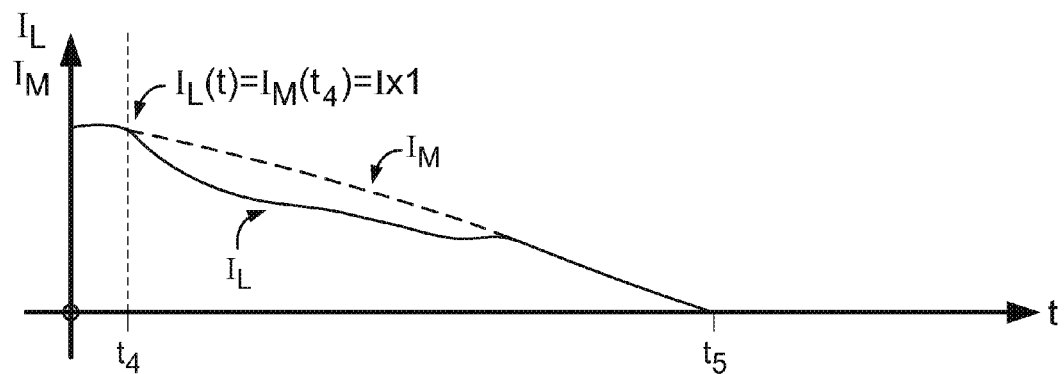
FIGS. 6A to 6F show operating waveforms of a multi-output regulator according to the invention.
Figure 6B:
Figure 6C:
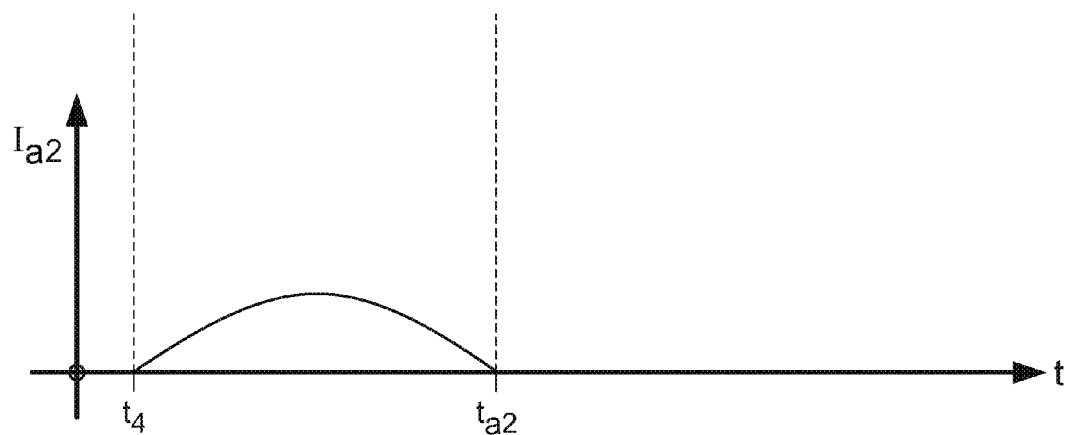
Figure 6D:
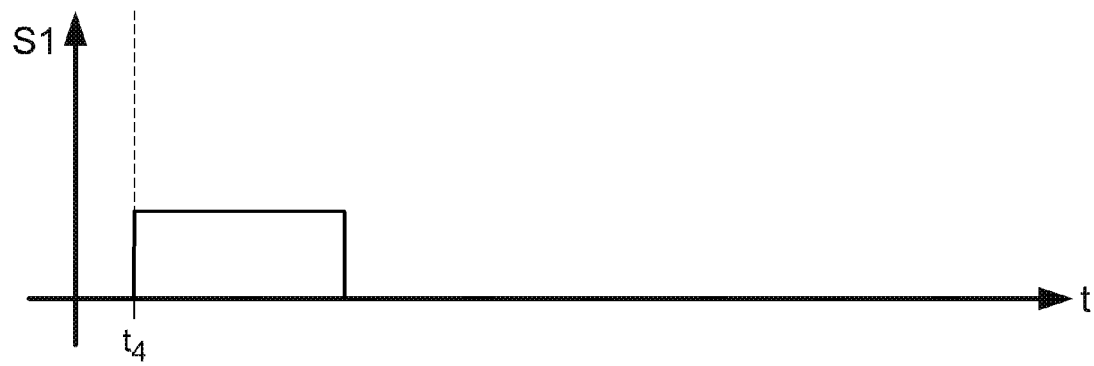
Figure 6E:
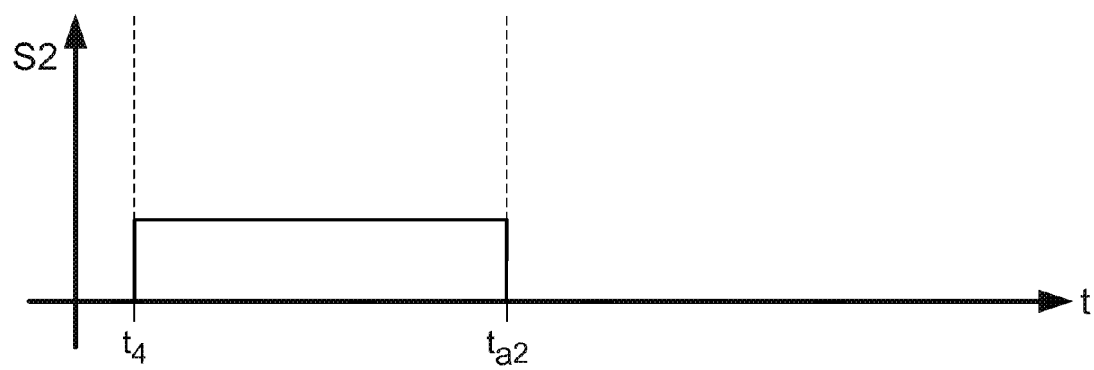
Figure 6F:
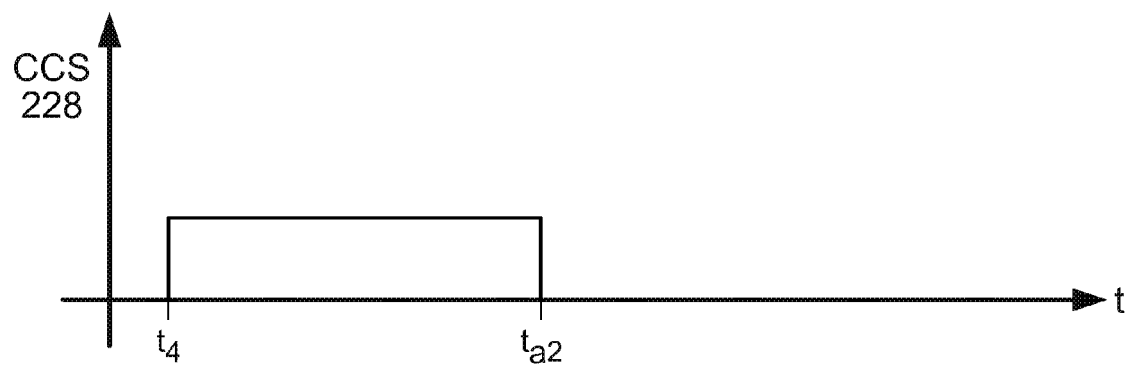

With reference to FIGS. 6A to 6F, if the auxiliary loads are unchanged and the load on the main output is decreased, the initial current $I_{X1}$ ($I_L(t4)=I_M(t4)=I_{X1}$: FIG. 6A) will be reduced. This will cause the length of the Auxiliary Phase (between times t4 and t5) to decrease. Thus, as the main load decreases, the time between ta2 (when currents in all auxiliary windings have decreased to zero) and t5 (when $I_L$ has decreased to zero) will decrease and, with further decrease in main load, eventually go to zero. Even further decreases in main load would result in $I_L$ reaching zero while current is still flowing in one or more auxiliary output circuits. If, as is the case for the underlying buck-boost converter without auxiliary outputs, switch S3 were turned off when $I_L$ reaches zero current, there may be insufficient energy delivered to one or more auxiliary outputs, causing the output voltage delivered by those auxiliary outputs to decline. A similar result would be reached if the main load remained constant and one or more of the auxiliary loads were increased. In either case, storage in the transformer prior to the beginning of the Auxiliary Phase of insufficient magnetizing energy to supply the total energy required by the MOR outputs would result in loss of "regulation" of one or more auxiliary outputs.

Although the Freewheel Phase in the standard buck-boost converter is terminated by turning switch S3 off when the current $I_L$ in inductor 21 is essentially zero, the Auxiliary Phase in an MOR may be extended by turning switch S3 OFF at the later to occur of: (1) CCS 228 going low, indicating that the currents Ia1, Ia2 in all auxiliary output circuits 221a, 221b have declined to zero, or (2) the current $I_L$ in inductor 21 declining to zero. This mode of operation is explained with reference to the example of FIGS. 8A-8F which show waveforms during the Auxiliary Phase of an MOR with essentially the same auxiliary loads as those used in the example of FIG. 6, but with the main output more lightly loaded.

The Auxiliary Phase begins at time t4 as shown with an initial current $I_L(t4)=I_{X2}$ (where $I_{X1}>I_{X2}$) flowing in winding 21. Beginning at time t4, currents Ia1 and Ia2 begin to increase in their respective leakage inductances 240a, 240b (FIGS. 8B and 8C) and the magnetizing current, Im, (shown as the dashed waveform in FIG. 8A) begins to decline, as does the current $I_L$ (shown as the solid waveform in FIG. 8A) that flows toward the main output (load 5, FIGS. 2 and 7). In response to the forward bias of active rectifiers 232a, 232b, the auxiliary switch controllers 226a, 226b turn on their respective switches 222a, 222b at essentially zero current and zero voltage, and output respective signals S1 and S2 causing CCS 228 to go high (FIGS. 8D, 8E, 8F) at time t4.

Figure 8A:
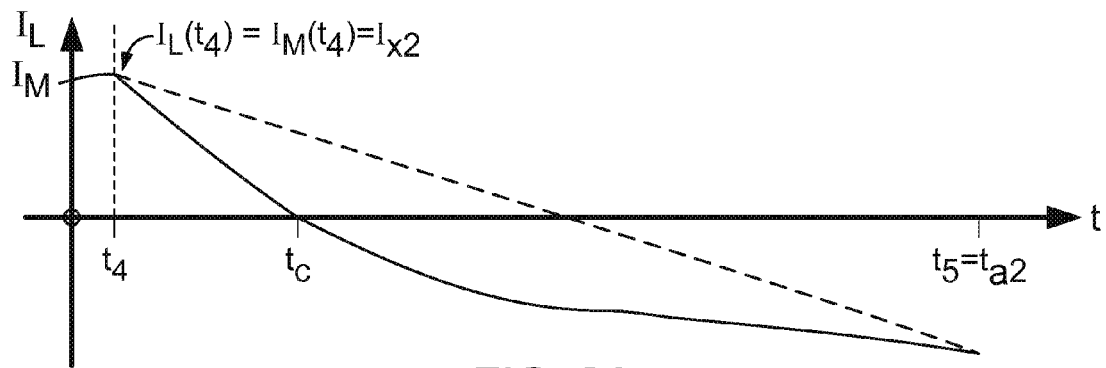
FIGS. 8A to 8F show operating waveforms of a multi-output regulator according to the invention.
Figure 8B:
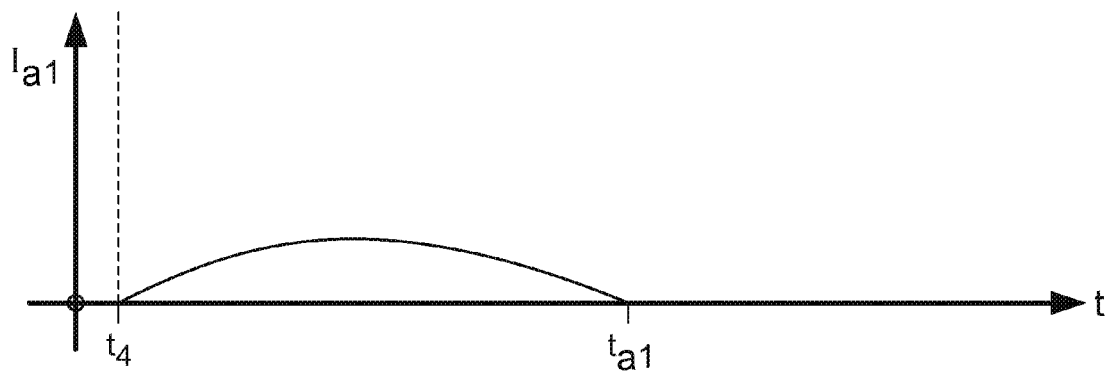
Figure 8C:
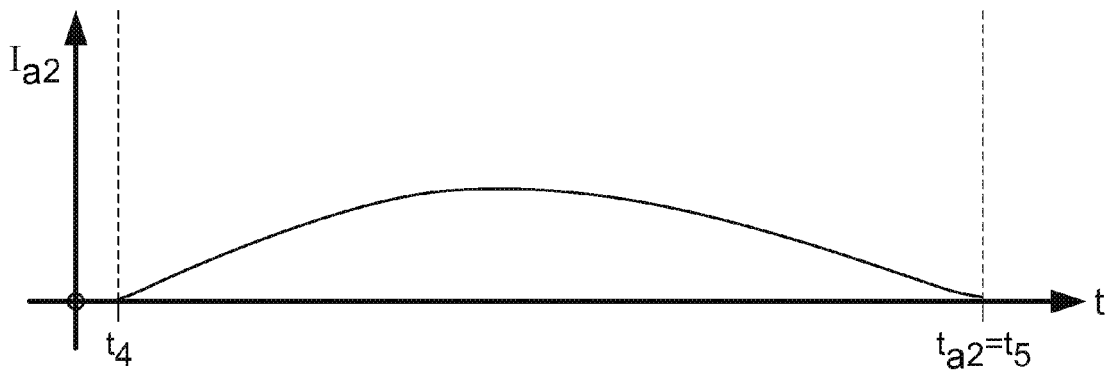
Figure 8D:
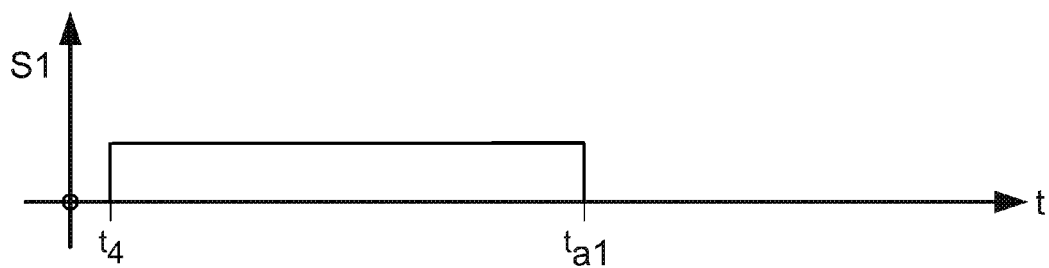
Figure 8E:
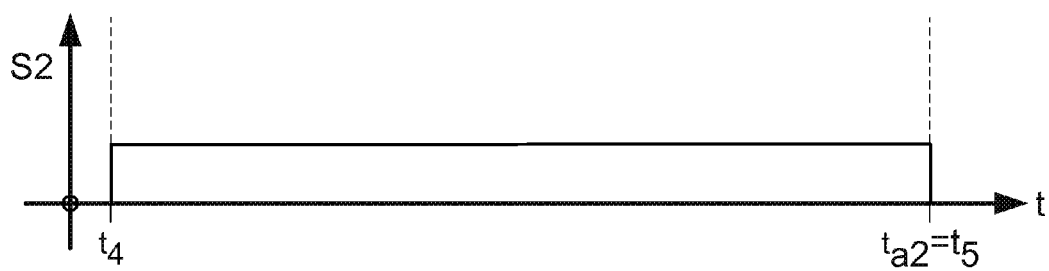
Figure 8F:
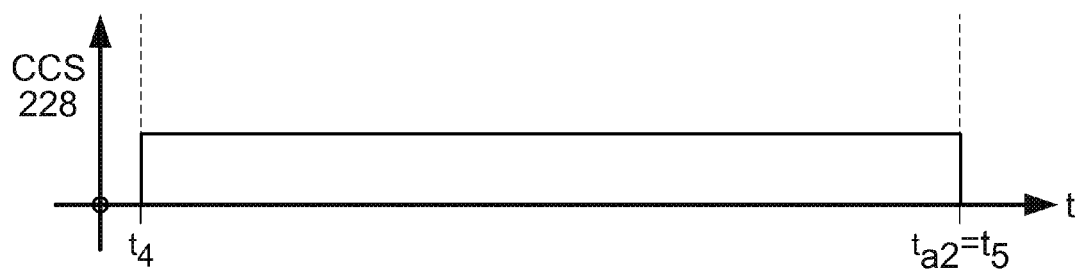

At time tc, current $I_L$ declines to zero (FIG. 8A). Because current is still flowing in each auxiliary winding (FIG. 8B, 8C), CCS 228 remains high, in response to which the switch controller 25 keeps switch S3 26 ON past the time tc when the main current returns to zero, extending the Auxiliary Phase and thus allowing the main current $I_L$ to go negative. Energy for the negative flow of current $I_L$ during the Auxiliary Phase is provided by main storage capacitor 260 (FIGS. 2 and 7). At time ta1 sufficient energy has been delivered to the output of auxiliary circuit 221a to charge auxiliary storage capacitor Ca1 224a to the auxiliary output voltage, Va, causing current Ia1 to decline to zero (FIG. 8B) and reversing the bias across active rectifier 232a. In response, auxiliary switch controller 226a turns switch 222a OFF at essentially zero current and essentially zero voltage and removes signal S1 (S1 transitions low FIG. 8D). The CCS 228 remains high because signal S2 remains high (FIG. 8E) indicating that active rectifier 232b is still forward biased and conducting (FIG. 8C). At time ta2, sufficient energy has been delivered to the output of auxiliary circuit 221b to charge auxiliary storage capacitor Ca2 224b to auxiliary output voltage, Vb, causing current Ia2 to decline to zero and reverse the bias across active rectifier 232b. In response, auxiliary switch controller 226b turns switch 222b OFF at essentially zero current and essentially zero voltage and removes signal S2 (S2 transitions low FIG. 8D), causing CCS 228 to go low (FIG. 8F). In response to the low CCS signal and the fact that the main current has already crossed zero (at time tc, FIG. 8A), the switch controller 25 turns switch S3 26 OFF at essentially zero voltage and with a negative main current flowing in the switch, thus terminating the Auxiliary Phase (at time t5=ta2, FIG. 8A).

The MOR 10 employs asynchronous operation of the auxiliary switches. The auxiliary switches, SA1 222a, SA2 222b, are controlled to function as synchronous rectifiers, turning ON and OFF (with ZCS transitions at zero or essentially zero current) when forward and reverse biased, respectively. To achieve asynchronous operation, each auxiliary switch, SA1

222a, SA2 222b is controlled as a function of circuit conditions in its respective auxiliary circuit and independently of the state of the other auxiliary switches and auxiliary circuits and independently of the main output switch S3 26. The asynchronous operation of the auxiliary switches allows each auxiliary switch to turn OFF at essentially zero current despite temporal differences in the auxiliary currents. For example, leakage inductances (240a, 240b, 240c, FIG. 7) associated with the various windings of the transformer 229 and parasitic capacitances may cause temporal differences in the auxiliary currents Ia1, Ia2, e.g. differences in the times, ta1, ta2, when the auxiliary currents return to zero (FIGS. 6, 8). The asynchronous ZCS operated auxiliary switches therefore help prevent potentially damaging voltage spikes across the switch, reducing ringing and overshoot, improving noise performance, avoiding active clamp or snubber circuitry, simplifying design, reducing cost, and improving overall reliability.

In the ZCS MOR 10, "regulation" of the auxiliary outputs (i.e., the auxiliary voltage outputs are maintained at values that are essentially equal to the main output voltage, Vo, multiplied by the respective turns ratio, e.g., Va=(N2/N1)*Vo and Vb=(N3/N1)*Vo) is maintained irrespective of the relative loading on different outputs. If, at the start of the Auxiliary Phase, sufficient energy is stored in the transformer 229 to supply the total energy required by all MOR outputs while the current $I_L$ remains positive, the Auxiliary Phase will be terminated at essentially the time that $I_L$ declines to zero. If, however, there is insufficient energy stored in the transformer 229 to supply the total energy required by all MOR outputs while the current $I_L$ remains positive, switch S3 26 will remain on, allowing $I_L$ to go negative and enabling energy to be transferred from the main storage capacitor 260 to the auxiliary outputs.

Over a first range of load conditions, enough energy is stored in the transformer to supply the total energy required by all MOR outputs: during each operating cycle, energy moves forward from the input source to be stored in the main output capacitor and the transformer and all of the energy required by the auxiliary outputs is supplied directly by transformer magnetizing energy. Over another range of load conditions, energy is "recycled" through the main storage capacitor: during each operating cycle, energy moves forward from the input source to be stored in the main output capacitor and the transformer, with a portion of the energy required by the auxiliary outputs being supplied directly by transformer magnetizing energy and the rest being supplied through the main storage capacitor.

Control of the ZCS MOR 10 is similar to that for the standard buck-boost converter. The switch controller 25 regulates the main output voltage, Vo, by varying the time duration of either or both of the Input and Input-Output phases, as explained in the Buck-Boost Patent. When loading conditions cause the Auxiliary Phase to be extended and the current $I_L$ to go negative, the switch controller may compensate for the change in initial conditions at the beginning of the Input Phase by increasing the length of either or both of the Input and Input-Output phases to maintain Vo in regulation.

Figure 9:
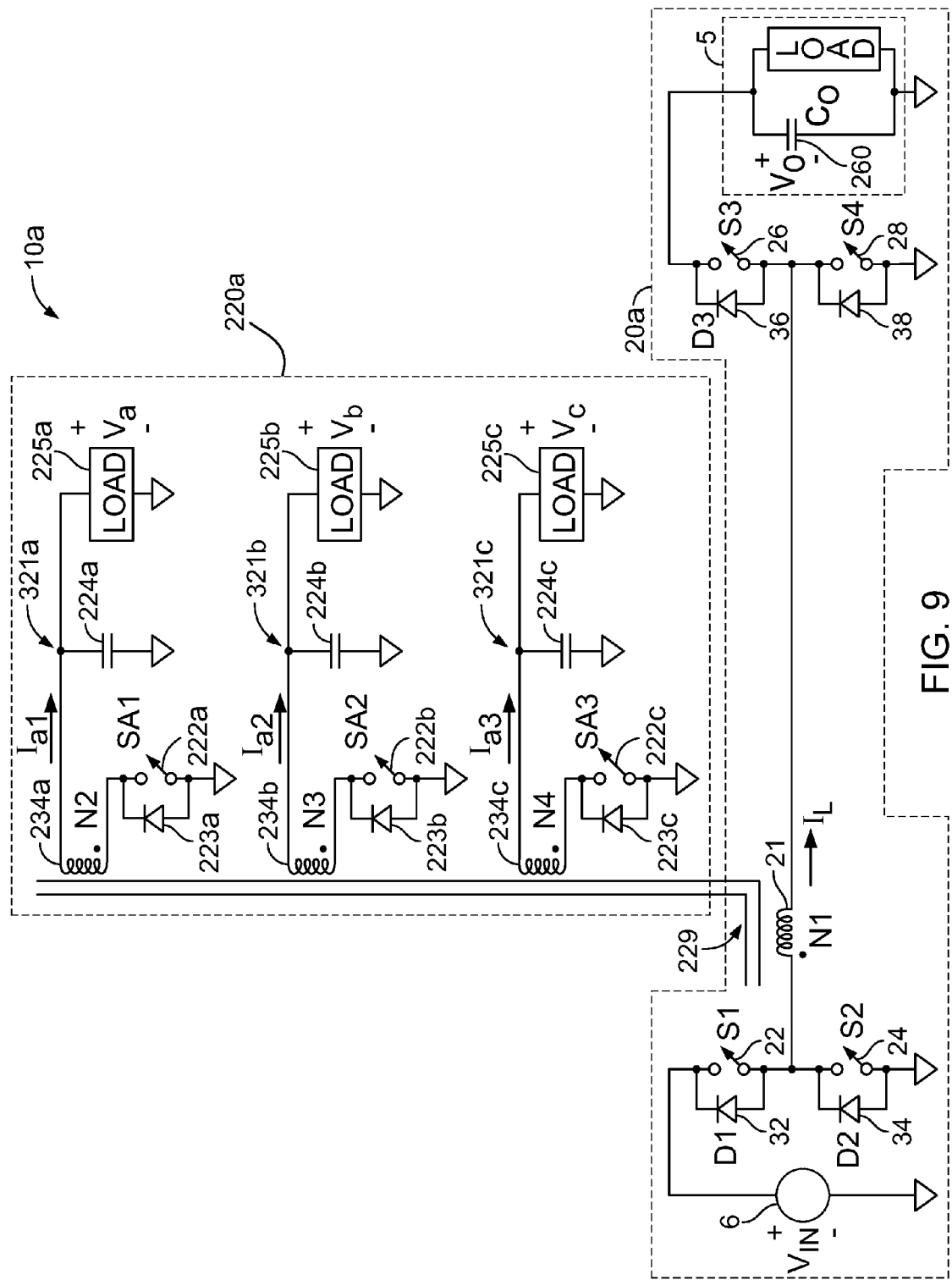
FIG. 9 shows another zero current switching multi-output regulator according to the invention.

Another example of a buck-boost ZCS MOR 10a is shown in the simplified schematic of FIG. 9. The ZCS MOR 10a (FIG. 9) is similar to the ZCS MOR 10 (FIG. 2) with a few differences that include an additional auxiliary output, a common ground shared by the main and auxiliary outputs, and ground referenced auxiliary switches. The ZCS MOR 10a (FIG. 9) includes an underlying buck-boost regulator 20a that may comprise the same components as the underlying buck-boost regulator 20 of the ZCS MOR 10 shown in FIG. 2. Components in the underlying buck-boost regulator 20a of FIG. 9 having an equivalent in the underlying buck-boost regulator 20 of FIG. 2 are labeled with the same reference designations.

Referring to FIG. 9, buck-boost ZCS MOR 10a comprises auxiliary output circuitry 220a comprising three auxiliary outputs 321a, 321b, 321c, each of which may also comprise the same components as an auxiliary output in FIG. 2 (e.g., auxiliary output 221a); components in auxiliary outputs 321a, 321b, 321c of FIG. 9 having an equivalent in auxiliary output 221a FIG. 2 are labeled with the same reference designations. For simplicity, certain components illustrated in FIG. 2 have been omitted from FIG. 9 (e.g., switch controllers, storage and parasitic capacitances). However, it should be understood that the converter 10a includes a controller that keeps switch S3 ON long enough to allow each of the auxiliary currents, Ia1, Ia2, Ia3 (in the auxiliary output circuits 321a, 321b, 321c) and the current $I_L$ in inductor 21 to decline substantially to zero as described and illustrated above with reference to FIGS. 2 through 8. In some implementations, as shown in FIG. 9, transformer 229 comprises an inductor winding 21 having N1=2 turns for the main output; an auxiliary winding 234a having N2=0.5 turns for auxiliary output 321a; an auxiliary winding 234b having N3=1 turn for auxiliary output 321b; and an auxiliary winding 234c having N4=1.5 turns for auxiliary output 321c. The ZCS MOR 10a may provide the following output voltages Main output voltage, Vo=24V; auxiliary output 321a voltage Va=(N2/N1)*Vo=6V; auxiliary output 321b voltage Vb=(N3/N1)*Vo=12V; and auxiliary output 321c voltage Vc=(N4/N1)*Vo=18V. In the embodiment of FIG. 9 the transformer 229 provides voltage transformation but because of the common ground, isolation between the main and auxiliary output voltages is not provided. It is understood that in other embodiments the transformer may provide isolation between the main output voltage Vo and one or more or all of the auxiliary output voltages (i.e., voltages Va, Vb, Vc). The common ground and ground referenced auxiliary switches 222a, 222b, and 222c allow for simplified gate drive circuitry providing an advantage in the ZCS MOR 10a (FIG. 9).

Figure 10:
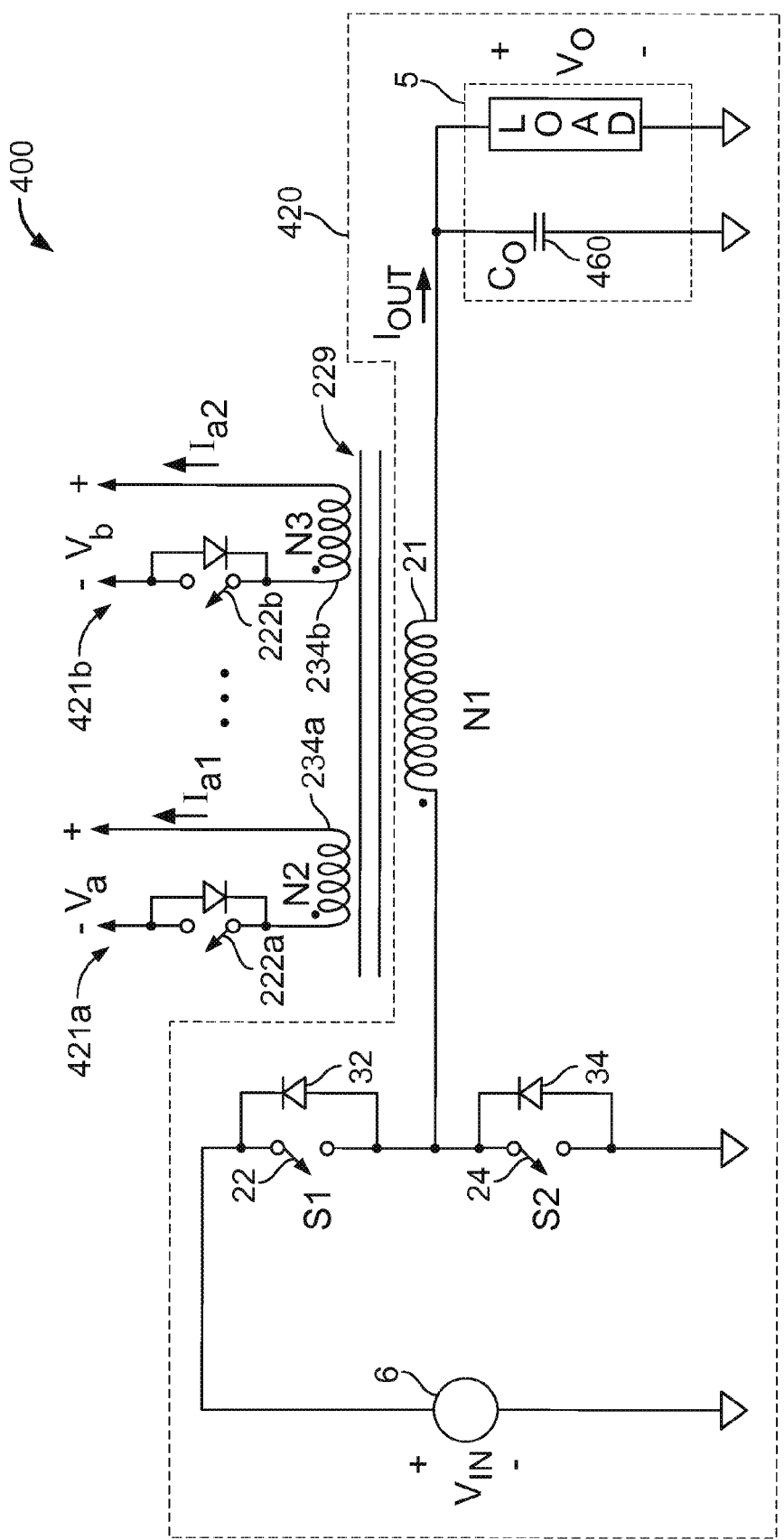
FIG. 10 shows a buck zero current switching multi-output regulator according to the invention.

It will be appreciated that the underlying buck-boost topology is capable of operation as a buck or a boost converter. In applications where the boost capability is unnecessary, the ZCS MOR may be simplified as shown in FIG. 10 and described below. Referring to FIG. 10, a ZCS MOR 400 comprising an underlying synchronous buck converter 420 is shown having a main output, Vo, and auxiliary outputs, Va 421a and Vb 421b. The underlying synchronous buck converter 420 includes a primary switch S1 22 connected to the input source 6 for driving the main winding 21 (having N1 turns) with power received from the unipolar input source 6. A main switch S2 24 provides a path for the main output current while the primary switch is OFF and the main winding is freewheeling (time period Tb discussed below). Two auxiliary outputs 421a, 421b are provided which respectively include auxiliary windings 234a, 234b having N2 and N3 turns coupled to main winding 21 to form transformer 229. It will be appreciated that the underlying buck converter omits two switches S3 and S4 compared to the underlying buck-boost converter of FIGS. 2 and 9.

Figure 12:
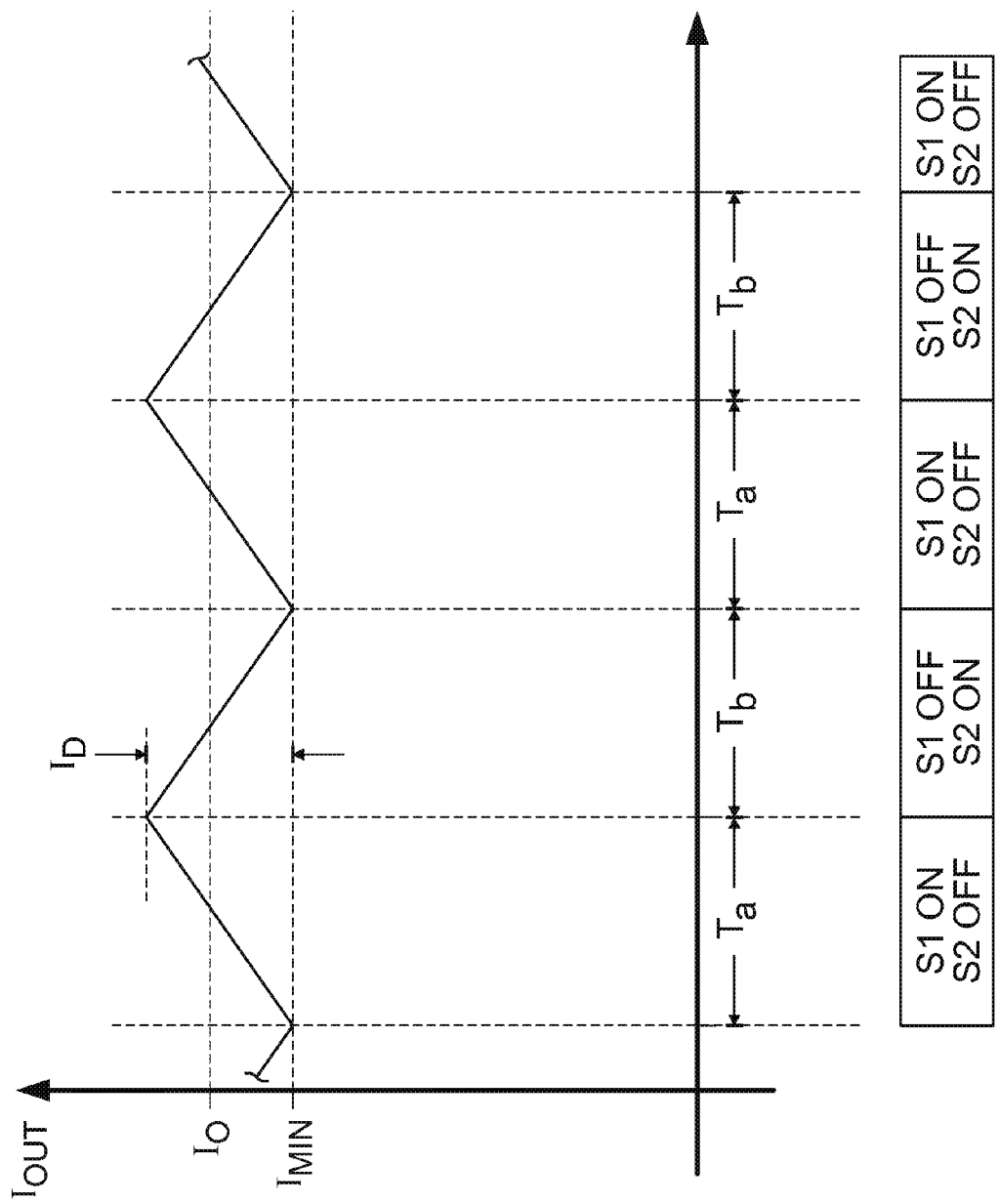
FIG. 12 shows an operating waveform for the zero current switching multi-output regulator of FIG. 10.

In operation, the relative timing of the ON and OFF states of the switches in the converter of FIG. 10 may be coordinated to control the main output voltage, Vo. Referring to FIG. 12, a waveform for the current Iout in main winding 21 shows the current flowing continuously, increasing during time periods Ta, when the input source is impressed across main winding 21 and energy is both transferred to the load 5 and stored in the transformer 229, and decreasing during the time periods Tb, when energy stored in transformer 229 is transferred to the main load 5 and to the auxiliary outputs (421a, 421b, FIG. 10). As illustrated in FIG. 12, the periods Ta correspond to switch S1 being ON and switch S2 being OFF, and the periods Tb correspond to switch S1 being OFF and switch S2 being ON, in the buck ZCS MOR 400 (FIG. 10).

With reference to FIG. 12, as the load on the main output is decreased, the average current Io will also decrease until, below some value of load (e.g., in FIG. 12, assuming an ideal converter, at a value of average load current Io≈$I_p$/2) the current Iout will decline to zero prior to the end of interval Tb. As explained above in connection with the buck-boost ZCS MOR 10 and 10a, if the current in the main winding is allowed to flow in reverse, e.g., by keeping the main switch S2 ON in the buck MOR 400 (FIG. 10) until the current in each auxiliary output (e.g. currents Ia1, Ia2, FIG. 10) returns substantially to zero, energy may be transferred from the main output (i.e., from storage capacitor 460, FIG. 10) into the auxiliary output(s) (421a, 421b, FIG. 10), thereby enabling the auxiliary outputs to remain in regulation irrespective of the amount of load on the main output Vo.

Figure 11:
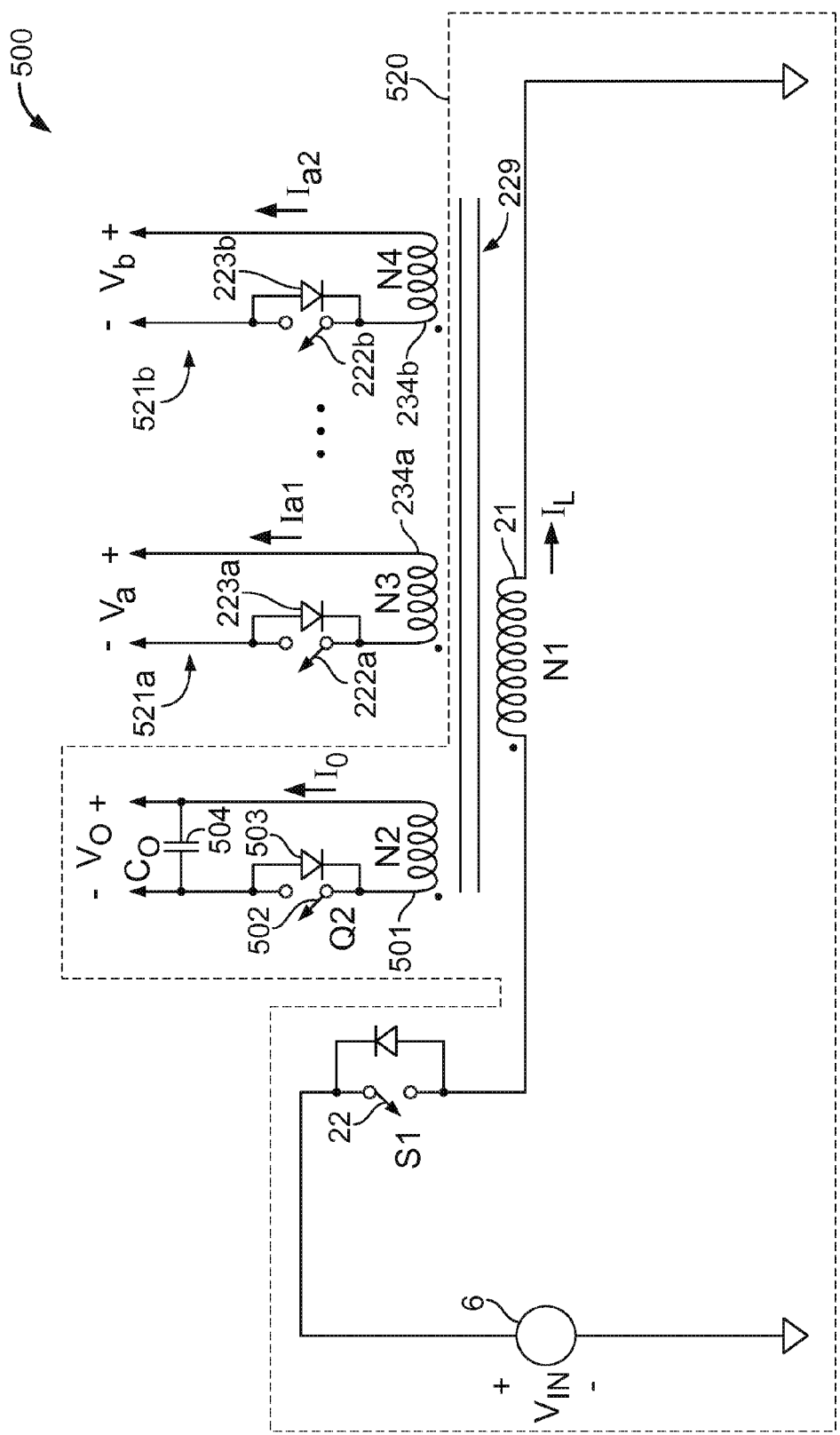
FIG. 11 shows a flyback zero current switching multi-output regulator according to the invention.

Referring to FIG. 11, another ZCS MOR 500, using an underlying flyback converter 520, is shown to have a main output Vo and auxiliary outputs Va 521a and Vb 521b. The underlying flyback converter 520 includes a primary switch S1 22 connected to the input source 6 for driving the primary winding 21 (having N1 turns) with power received from the unipolar input source 6. A main switch, Q2 502, as shown is connected to secondary winding 501 (which in this case is the main winding) and provides a current path for the main output current Io. Two auxiliary outputs 521a, 521b are shown which, respectively, include auxiliary switches Q3 222a and Q4 222b and auxiliary windings 234a, 234b having N3 and N4 turns coupled to main winding 21. Windings 21, 501, 234a and 234b form a transformer 229.

Figure 1:
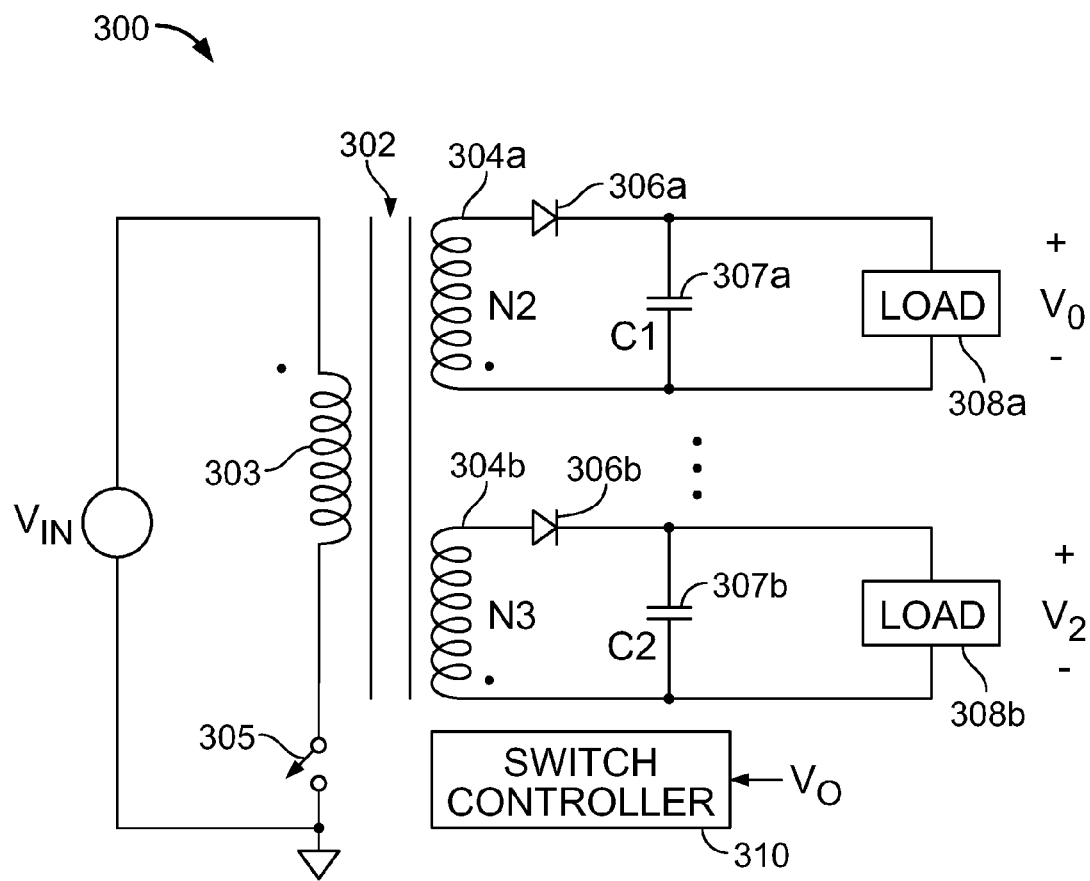
FIG. 1 shows a multi-output flyback converter.

The underlying flyback converter 520 may operate in the same fashion as the flyback converter of FIG. 1. With reference to FIG. 11, when primary switch 22 is turned ON, the input voltage, Vin, is impressed across main winding 21, the main switch 502 and auxiliary switches 222a, 222b are OFF and the secondary side rectifiers 503, 223a, 223b are reverse biased and non-conductive, and magnetic energy is stored in transformer 229. When primary switch 22 is turned OFF, the voltages across the windings reverse, the main switch and auxiliary switches conduct and energy stored in the transformer is transferred to the main and auxiliary outputs. The duty cycle of primary switch 22 may be controlled to regulate the main output voltage at an essentially fixed value, Vo. During the time that the primary switch 22 is off, and assuming ideal components (e.g., no voltage drops across switches; no winding resistances or leakage inductance in the transformer 229) the voltage across the main output winding 501 will be clamped to Vo; the voltage across auxiliary winding 234a will be Va=(N3/N2)*Vo; and the voltage across auxiliary winding 234b will be Vb=(N4/N2)*Vo.

As described above in connection with the buck-boost and buck ZCS MOR topologies (FIGS. 2, 9, 10), at times of heavy auxiliary output loading (on one or more auxiliary outputs) and relatively light main output, Vo, loading, energy stored in the transformer during the ON time of primary switch 22 (controlled as a function of the main output) may be insufficient to meet the total energy requirements of all of the outputs during the time that the primary switch is OFF. Accordingly, the main switch Q2 502 may be held ON in the manner described above until the current in each auxiliary output (e.g. currents Ia1, Ia2, FIG. 11) returns substantially to zero to allow the current in the main winding 501 to flow in reverse, transferring energy from the main output (i.e., from storage capacitor Co 504, FIG. 11) into the auxiliary output(s) (521a, 521b, FIG. 11), and enabling the auxiliary outputs to remain in regulation irrespective of the amount of load on the main output Vo.

To summarize, the main output switch, 24 (FIG. 10) and 502 (FIG. 11), may be turned ON when the voltage across the main winding is essentially matched to the main output voltage Vo, and a positive current Io begins to flow, i.e. at essentially zero current and zero voltage; and turned OFF after each of the auxiliary currents return, or after the main current returns, essentially to zero, whichever is later. The references to the main current returning essentially to zero refers to the point in time when the main current exhibits a zero-crossing transition (analogous to the $I_L$ zero-crossing at t5 in FIG. 6A and at tc in FIG. 8A) from the positive or forward direction (Iout in FIGS. 2, 10; Io in FIG. 11) while the main winding is freewheeling and the reverse direction as a result of the main switch being held ON to transfer energy from the main output to one or more of the auxiliary outputs. Thus for purposes of the timing architecture being described, a negative current flowing in the main switch, which occurs after the main current has returned to zero, does not necessarily prolong the ON time of the main switch after each auxiliary current returns essentially to zero current.

A number of embodiments of the invention have been described. Nevertheless, it will be understood that various modifications may be made without departing from the spirit and scope of the invention. For example, switch controller 25 may comprise a digital microcontroller and the function of OR gate 227 may be implemented in the firmware of the microcontroller. Diodes shown in parallel with switches may be intrinsic to the switches or may be discrete devices. The primary switch S1 in FIG. 11 may alternatively be provided at the grounded end of the primary to use ground referenced gate drive circuitry.

Although Buck-Boost ZCS MOR 10 (FIG. 2) illustrates a 3 output system (1 main and 2 auxiliary), Buck-Boost ZCS MOR 10a (FIG. 9) illustrates a 4 output system (1 main and 3 auxiliary), Buck ZCS MOR 400 (FIG. 10) illustrates a 3 output system (1 main and 2 auxiliary), and Fly-Back ZCS MOR 500 (FIG. 11) illustrates a 3 output system (1 main and 2 auxiliary), any number of auxiliary windings and auxiliary outputs may be provided using the invention.

Accordingly, other embodiments are within the scope of the following claims.

What is claimed is:

1. Apparatus for converting power from an input source for delivery to a main output at a main voltage and a first auxiliary output at a first auxiliary voltage, the apparatus comprising,
   a transformer having a main winding and a first auxiliary winding,
   a primary switch connected to drive the transformer with power from the input source,
   a controller adapted to operate the primary switch in a series of converter operating cycles,
   a main switch connected to the main winding and configured in an ON state to carry a current flowing in the main winding at times when the primary switch is OFF to deliver power to the main output;
   a first auxiliary rectification circuit connected to the first auxiliary winding and configured in an ON state to carry a first auxiliary current flowing in the first auxiliary winding to deliver power to the first auxiliary output, wherein the main switch is configured to turn ON for a first condition and selectively turn OFF for a second condition or selectively remain ON past occurrence of the second condition; and wherein the first auxiliary rectification circuit is configured to turn ON for a third condition and to turn OFF for a fourth condition.

2. The apparatus of claim 1 wherein the first condition essentially coincides with the start of the current flowing in the main winding and the second condition essentially coincides with the current in the main winding returning to zero.

3. The apparatus of claim 1 wherein the third condition essentially coincides with the start of auxiliary current flow in the first auxiliary winding and the fourth condition essentially coincides with the auxiliary current flow in the first auxiliary winding returning to zero.

4. The apparatus of claim 3 wherein the first condition essentially coincides with the start of the current flowing in the main winding, the second condition essentially coincides with the current in the main winding returning to zero, and the main switch is configured to remain ON until occurrence of the fourth condition.

5. The apparatus of claim 1 further comprising a main switch controller configured to (a) turn ON the main switch at or near the start of the flow of current in the main winding and (b) turn OFF the main switch after (i) the current in the main winding returns to zero and (ii) the first auxiliary current in the first auxiliary winding returns to zero.

6. The apparatus of claim 1 wherein the first auxiliary rectification circuit comprises a first auxiliary switch and a first auxiliary switch controller, the first auxiliary switch controller being configured to turn the first auxiliary switch ON to carry auxiliary current flowing in the first auxiliary winding with a polarity tending to supply power to the first auxiliary output and OFF to block auxiliary current flowing in the first auxiliary winding with a polarity tending to withdraw power from the first auxiliary output.

7. The apparatus of claim 6 wherein the first auxiliary switch controller is configured to sense a voltage polarity across the first auxiliary switch and to turn the first auxiliary switch ON for a first voltage polarity and OFF for an opposite voltage polarity.

8. The apparatus of claim 6 further comprising a main switch controller having an input for receiving a signal from the first auxiliary switch controller, the main switch controller being configured to (a) turn ON the main switch essentially at the start of the flow of current in the main winding and (b) turn OFF the main switch after (i) the current in the main winding returns to zero and (ii) the signal indicates that the first auxiliary switch controller has sensed the opposite voltage polarity across the first auxiliary switch.

9. The apparatus of claim 8 wherein the main switch controller further comprises an input for sensing a voltage polarity across the main switch and being configured to turn the main switch ON for a first voltage polarity and OFF for an opposite voltage polarity when the signal indicates that the first auxiliary switch controller has sensed the opposite voltage polarity across the first auxiliary switch.

10. The apparatus of claim 6 further comprising:
a second auxiliary winding,
a second auxiliary output,
a second auxiliary rectification circuit including a second auxiliary switch and a second auxiliary switch controller configured to turn the second auxiliary switch ON to carry auxiliary current flowing in the second auxiliary winding with a polarity tending to supply power to the second auxiliary output and OFF to block auxiliary current flowing in the second auxiliary winding with a polarity tending to withdraw power from the second auxiliary output; and a main switch controller having an input for receiving a signal from the first and second auxiliary switch controllers, the main switch controller being configured to (a) turn ON the main switch essentially at the start of the flow of current in the main winding and (b) turn OFF the main switch after (i) the current in the main winding returns to zero and (ii) the signal indicates that the first and second auxiliary switch controllers have or are in the process of turning the first and second auxiliary switches OFF.

11. The apparatus of claim 10 wherein
the first auxiliary switch controller is configured to sense a voltage polarity across the first auxiliary switch and to turn the first auxiliary switch ON for a first voltage polarity and OFF for an opposite voltage polarity;
the second auxiliary switch controller is configured to sense a voltage polarity across the second auxiliary switch and to turn the second auxiliary switch ON for a first voltage polarity and OFF for an opposite voltage polarity.

12. The apparatus of claim 11 wherein the main switch controller further comprises an input for sensing a voltage polarity across the main switch and being configured to turn the main switch ON for a first voltage polarity and OFF for an opposite voltage polarity when the signal indicates that the first and second auxiliary switch controllers have sensed the opposite voltage polarity across the first and second auxiliary switches.

13. The apparatus of claim 8 wherein the main switch controller is adapted to sense the main voltage.

14. The apparatus of claim 8 or 11 wherein:
the transformer comprises a primary winding;
the primary switch is connected to drive the primary winding with power from the input source; and
the main winding comprises a secondary winding of the transformer.

15. The apparatus of claim 8 or 11 wherein:
the main winding has a first and a second terminal and comprises a primary winding of the transformer,
the primary switch and main switch are configured to be connected to the first terminal of the main winding; and
the current flows from the second terminal to the main output.

16. The apparatus of claim 15 wherein the primary switch is connected to carry current between a first terminal of the input source and the first terminal of the main winding and the main switch is connected to carry current between a second terminal of the input source and the first terminal of the main winding.

17. The apparatus of claim 8 or 11 wherein:
the main winding has a first and a second terminal and comprises a primary winding of the transformer,
the primary switch and main switch are adapted to be connected to the first terminal of the main winding,
and further comprising a second primary switch and a second main switch each adapted to be connected to the second terminal of the main winding.

18. The apparatus of claim 17 wherein each converter operating cycle includes:
(i) an input ("IN") phase during which the main winding is connected across the source for a time $T_{IN}$,
(ii) a input-output ("IO") phase during which the main winding is connected between the source and the main output for a time $T_{IO}$, (iii) an auxiliary ("AUX") phase during which the main winding is connected across the output for a time $T_{AUX}$.

19. The apparatus of claim 18 wherein each converter operating cycle further includes:
(iv) a clamp phase during which the main winding of the transformer is clamped, the clamp phase being characterized by essentially zero voltage across the main winding and an average value of current flowing in the main winding.

20. The apparatus of claim 17 wherein
the primary switch is connected to carry current between a first terminal of the input source and the first terminal of the main winding;
the main switch is connected to carry current between a second terminal of the input source and the first terminal of the main winding;
the second primary switch is connected to carry current between the second terminal of the main winding and the second terminal of the input source; and
the second main switch is connected to carry current between the second terminal of the main winding and the main output.

21. Apparatus for converting power from an input source for delivery to a main output at a main voltage and a plurality of auxiliary outputs at respective auxiliary voltages, the apparatus comprising:
a transformer having a main winding and a plurality of auxiliary windings,
a primary switch connected to drive the transformer with power from the input source,
a main switch connected to the main winding and configured in an ON state to carry a current flowing in the main winding at times when the primary switch is OFF to deliver power to the main output,
a plurality of auxiliary rectification circuits, each connected to a respective auxiliary winding and configured in an ON state to carry a respective auxiliary current flowing in the respective auxiliary winding to deliver power to the respective auxiliary output, and
a controller adapted to operate the primary switch in a series of converter operating cycles, and wherein
the main switch is configured to turn ON for a first condition and selectively turn OFF for either a second condition or a fifth condition, and
each auxiliary rectification circuit is configured to turn ON for a respective third condition and to turn OFF for a respective fourth condition.

22. The apparatus of claim 21 wherein
the second condition in a respective converter operating cycle is essentially when a current flowing from the main winding to the main output with a polarity that delivers power to the main output reaches zero current;
the respective fourth condition for each auxiliary switch in a respective converter operating cycle is essentially when the auxiliary current flowing from its respective auxiliary winding with a polarity that delivers power to its respective auxiliary output reaches zero current;
the fifth condition is essentially when the last of the respective fourth conditions occurs; and
the main switch turns OFF essentially for the occurrence of the second condition or the fifth condition whichever occurs later in a converter operating cycle.

23. The apparatus of claim 22 wherein the respective third condition for each auxiliary switch in a respective converter operating cycle is essentially when the auxiliary current begins to flow from its respective auxiliary winding with a polarity that delivers power to its respective auxiliary output.

24. The apparatus of claim 23 wherein the first condition in a respective converter operating cycle is essentially when a current begins to flow from the main winding to the main output with a polarity that delivers power to the main output.

25. A method for converting power from an input source for delivery to a main output at a main voltage and a first auxiliary output at a first auxiliary voltage, the method comprising,
providing a transformer with a main winding and a first auxiliary winding,
using a primary switch to drive the transformer with power from the input source,
operating the primary switch in a series of converter operating cycles,
using a main switch connected to the main winding to, in an ON state, carry a current flowing in the main winding at times when the primary switch is OFF to deliver power to the main output;
using a first auxiliary rectification circuit connected to the first auxiliary winding to, in an ON state, carry a first auxiliary current flowing in the first auxiliary winding to deliver power to the first auxiliary output,
turning the main switch ON for a first condition and
selectively turning the main switch OFF for a second condition or holding the main switch ON past occurrence of the second condition; and
turning the first auxiliary rectification circuit ON for a third condition and OFF for a fourth condition.

26. The method of claim 25 wherein the first condition essentially coincides with the start of the current flowing in the main winding and the second condition essentially coincides with the current in the main winding returning to zero.

27. The method of claim 25 wherein the third condition essentially coincides with the start of auxiliary current flow in the first auxiliary winding and the fourth condition essentially coincides with the auxiliary current flow in the first auxiliary winding returning to zero.

28. The method of claim 27 wherein the first condition essentially coincides with the start of the current flowing in the main winding, the second condition essentially coincides with the current in the main winding returning to zero, and the main switch is configured to remain ON until occurrence of the fourth condition.

29. The method of claim 25 further comprising using a main switch controller to (a) turn ON the main switch at or near the start of the flow of current in the main winding and (b) turn OFF the main switch after (i) the current in the main winding returns to zero and (ii) the first auxiliary current in the first auxiliary winding returns to zero.

30. The method of claim 25 further comprising using a first auxiliary switch in the first auxiliary circuit to carry a current flowing in the first auxiliary winding with a polarity tending to supply power to the first auxiliary output in an ON state and to block auxiliary current flowing in the first auxiliary winding with a polarity tending to withdraw power from the first auxiliary output in an OFF state.

31. The method of claim 30 further comprising: sensing a voltage polarity across the first auxiliary switch and turning the first auxiliary switch ON for a first voltage polarity and OFF for an opposite voltage polarity across the first auxiliary switch.

32. The method of claim 31 further comprising:
providing a first signal indicating whether the first or opposite polarity has been sensed across the first auxiliary switch; and
using a switch controller to (a) turn ON the main switch essentially at the start of the flow of current in the main winding and (b) turn OFF the main switch after (i) the current in the main winding returns to zero and (ii) the signal indicates the opposite polarity has been sensed across the first auxiliary switch.

33. The method of claim 32 further comprising sensing a voltage polarity across the main switch and turning the main switch ON for a first voltage polarity across the main switch and OFF for an opposite voltage polarity across the main switch when the signal indicates the opposite polarity has been sensed across the first auxiliary switch.

34. The method of claim 30 further comprising:
providing the transformer with a second auxiliary winding,
using a second auxiliary switch in the second auxiliary circuit to carry a current flowing in the second auxiliary winding with a polarity tending to supply power to the second auxiliary output in an ON state and to block auxiliary current flowing in the second auxiliary winding with a polarity tending to withdraw power from the second auxiliary output in an OFF state;
sensing a voltage polarity across the first auxiliary switch and turning the first auxiliary switch ON for a first voltage polarity and OFF for an opposite voltage polarity across the first auxiliary switch;
providing a first signal indicating whether the first or opposite polarity has been sensed across the first auxiliary switch;
sensing a voltage polarity across the second auxiliary switch and turning the second auxiliary switch ON for a first voltage polarity and OFF for an opposite voltage polarity across the second auxiliary switch;
providing a second signal indicating whether the first or opposite polarity has been sensed across the second auxiliary switch and
using a switch controller to (a) turn ON the main switch essentially at the start of the flow of current in the main winding and (b) turn OFF the main switch after (i) the current in the main winding returns to zero and (ii) the first signal indicates the opposite polarity has been sensed across the first auxiliary switch and (iii) the second signal indicates the opposite polarity has been sensed across the second auxiliary switch.

35. The apparatus of claim 34 wherein the switch controller senses a voltage polarity across the main switch to determine when the flow of current in the main winding starts and when the current in the main winding returns to zero.

36. The method of claim 35 further comprising using the switch controller to sense the main voltage.

37. The method of claim 32 or 35 wherein:
the transformer comprises a primary winding;
the primary switch is connected to drive the primary winding with power from the input source; and
the main winding comprises a secondary winding of the transformer.

38. The method of claim 32 or 35 further comprising:
providing the main winding with a first and a second terminal,
connecting the primary switch and main switch to the first terminal of the main winding;
connecting the second terminal to supply current to the main output, and
using the main winding as a primary winding of the transformer.

39. The method of claim 38 connecting the primary switch to carry current between a first terminal of the input source and the first terminal of the main winding and connecting the main switch to carry current between a second terminal of the input source and the first terminal of the main winding.

40. The method of claim 32 or 35 further comprising:
providing the main winding with a first and a second terminal,
using the main winding as a primary winding of the transformer,
connecting the primary switch and main switch to the first terminal of the main winding,
connecting a second primary switch and a second main switch to the second terminal of the main winding.

41. The method of claim 40 wherein each converter operating cycle includes:
(i) an input ("IN") phase during which the main winding is connected across the source for a time $T_{IN}$,
(ii) a input-output ("IO") phase during which the main winding is connected between the source and the main output for a time $T_{IO}$,
(iii) an auxiliary ("AUX") phase during which the main winding is connected across the output for a time $T_{AUX}$.

42. The method of claim 41 wherein each converter operating cycle further includes:
(iv) a clamp phase during which the main winding of the transformer is clamped, the clamp phase being characterized by essentially zero voltage across the main winding and an average value of current flowing in the main winding.

43. The method of claim 40 further comprising:
using the primary switch to carry current between a first terminal of the input source and the first terminal of the main winding;
using the main switch to carry current between a second terminal of the input source and the first terminal of the main winding;
using the second primary switch to carry current between the second terminal of the main winding and the second terminal of the input source; and
using the second main switch to carry current between the second terminal of the main winding and the main output.

* * * * *

UNITED STATES PATENT AND TRADEMARK OFFICE
CERTIFICATE OF CORRECTION

PATENT NO. : 8,791,591 B1  
APPLICATION NO. : 12/710786  
DATED : July 29, 2014  
INVENTOR(S) : Patrizio Vinciarelli Page 1 of 1

It is certified that error appears in the above-identified patent and that said Letters Patent is hereby corrected as shown below:

In the Specification

Column 4, Line 28, Delete "("TO")" and insert -- ("IO") --

Column 9, Line 16, Delete "t1 at" and insert -- ta1 --

In the Claims

Column 16, Line 67, In Claim 18, delete "$T_{IO}$)," and insert -- $T_{IO}$, --

Column 19, Line 42, In Claim 35, delete "apparatus" and insert -- method --

Signed and Sealed this  
Sixteenth Day of December, 2014

Michelle K. Lee  
*Deputy Director of the United States Patent and Trademark Office*